United States Patent [19]
Koga et al.

[11] Patent Number: 4,730,186
[45] Date of Patent: Mar. 8, 1988

[54] INPUT INTEGRATED FLAT PANEL DISPLAY SYSTEM

[75] Inventors: Kazuyoshi Koga; Yasushi Fukunaga, both of Hitachi; Soshiro Kuzunuki, Katsuta; Ryo Fujita, Hitachi, all of Japan

[73] Assignee: Hitachi, Ltd., Tokyo, Japan

[21] Appl. No.: 724,925

[22] Filed: Apr. 19, 1985

[30] Foreign Application Priority Data

Apr. 20, 1984 [JP] Japan ................................. 59-78507
Aug. 15, 1984 [JP] Japan ................................. 59-169353

[51] Int. Cl.$^4$ .............................................. G09G 1/00
[52] U.S. Cl. .................................... 340/708; 340/712; 340/716; 340/721; 340/784; 178/18
[58] Field of Search ............... 340/708, 709, 712, 706, 340/721, 707, 784, 792, 716; 178/18

[56] References Cited
U.S. PATENT DOCUMENTS

| | | | |
|---|---|---|---|
| 4,070,710 | 1/1978 | Sukonick et al. | 340/724 |
| 4,232,311 | 11/1980 | Agenta | 340/703 |
| 4,419,661 | 12/1983 | Hetsugi | 340/707 |
| 4,451,895 | 5/1984 | Sliwkowski | 340/712 |
| 4,521,870 | 6/1985 | Babbel et al. | 340/712 |

FOREIGN PATENT DOCUMENTS 0049781 4/1980 Japan ..................................... 178/18

OTHER PUBLICATIONS

L. Kool—"The Scribophone: A Graphic Telecommunication System"—Philips Telecommunication Review, vol. 38, No. 1, Jan./1980—pp. 7–10.
G. P. Torok—"Electronic Blackboard Have Chalk Will Travel"—Bell Telephone Laboratories, Incorporated—1977 International Conference on Communication—Jan./1977—pp. 19.1-22-19.1-25.

Primary Examiner—Gerald L. Brigance
Assistant Examiner—Mahmoud Fatahi-Yar
Attorney, Agent, or Firm—Antonelli, Terry & Wands

[57] ABSTRACT

A system using an input integrated flat panel display of an integrated structure, having an input device for inputting through handwriting characters, graphics, or points and a flat panel display laid upon the input device for displaying in accordance with an input point data input through handwriting. The frame memory of a large screen having a display screen larger than that of the flat panel display is arranged to be read out through the input device of the input integrated flat panel display. In addition, the readout contents of the large screen frame memory is arranged to be copied onto the flat display of the input integrated flat panel display. The input integrated flat panel display system can improve the man-machine performance while the amateur end user performs document processings, graphic processings and the like.

12 Claims, 24 Drawing Figures

FIG. 19
(a)
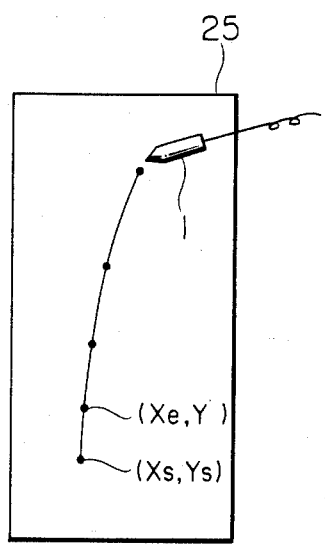
(b)
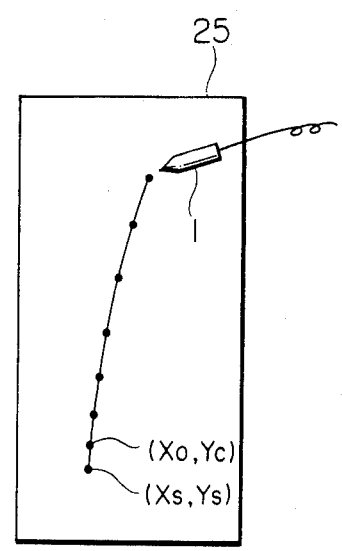

INPUT INTEGRATED FLAT PANEL DISPLAY SYSTEM

CROSS-REFERENCES TO RELATED APPLICATIONS

This application relates to two U.S. applications Ser. Nos. 716,943 and 716,944, filed Mar. 28, 1985 and assigned to the present assignee, one being entitled "Method for Designating a Recognition Mode in Handwritten Character/Graphic Recognizer", based on Japanese Patent Application No. 59-58298 filed Mar. 28, 1984 and the other entitled "Apparatus for Recognizing and Displaying Hand-written Characters and Figures" based on Japanese Patent Application No. 59-60717 filed Mar. 30, 1984, and whose disclosure is incorporated herein by reference.

BACKGROUND OF THE INVENTION

The present invention relates to an input integrated flat panel display system with a good man-machine performance in which an input device and an output device are integrated and the user can input data in handwritten form which is suitable for unskilled or amateur end users not accustomed to keyboards.

Recently, rapid development has occurred in the business transaction field mainly with respect to such operations as a document processing and graphic or figure processing, office automation has progressed rapidly, and OA (Office Automation) apparatuses such as word processors and personal computers have been increasingly employed. Conventionally, in processing data handwritten characters of figures are inputted through an input device such as a digitizer called a "tablet" and the recognized results or handwritings are displayed on an input device, such as a CRT (Cathode Ray Tube) display and then subjected to various processings. With the system using such input and output devices independent from each other, the user must confirm the inputs of characters or figures written on the digitizer by looking on each input occasion at the CRT display. Also, in editing, it is necessary to observe the characters or figures written on the CRT display while operating upon the digitizer. Thus, the work efficiency of the conventional device is very low.

Also known is a system using a CRT as an output device and a light pen as an input device. This system, however, has serious problems, since the thickness between the surface of a CRT and its fluorescent screen is more than 10 mm, and so the problem of parallax is difficult to solve; in addition, the user's arms become fatigued to a large degree unless the environmental structures are modified.

Apparatuses solving the above problems and improving operational performances are known in: (1) an article entitled "ON-LINE HANDWRITTEN CHINESE CHARACTER RECOGNITION HAVING A TREND OF RELAXING RESTRICTIONS ON THE WAY OF HANDWRITING SUCH AS DEFORMED WRITING CHARACTERS" at pages 115 to 133, Vol. 12.5, 1983, of NIKKEI ELECTRONICS published by Nikkei-McGraw-Hill, Inc.; (2) Japanese Patent Laid-Open Publication No. SHO 49-123239 entitled "PICTURE IMAGE INPUT DEVICE"; (3) Japanese Patent Laid-Open Publication No. SHO 58-14247 entitled "COORDINATE INPUT DEVICE WITH DISPLAY"; (4) Japanese Patent Laid-Open Publication No. SHO 58-96382 entitled "HANDWRITTEN CHARACTER RECOGNITION AND DISPLAY DEVICE"; and (5) Japanese Patent Laid-Open Publication No. SHO 58-144287 entitled "HANDWRITING INPUT WORD PROCESSOR" wherein there is described a flat panel display having a transparent digitizer mounted on the upper face of a flat display (such as an LCD (Liquid Crystal Display), EL (Electro-Luminescent) or plasma display), the input device and the output (display) device being integrated.

The input/output integrated display uses as a display device a flat panel display unit such as a LCD. This is because the flat panel display unit is suitable for attaining an integrated structure. The following problems arise if a highly precise and fine display type CRT display is used as a display device for the input/output integrated display:

(1) The thickness of the glass on the CRT screen is about 2 cm, which results in a relatively long distance between the writing surface of the input plate and the display surface. Therefore, parallax exists and a special coordinate transformation is required for compensating the parallax.

(2) Since the distance between the writing surface and the display surface becomes long, the user obtains a different feeling from that of actual writing. Moreover the display contents on the display surface can not be correctly recognized, which might be subjected to change for example by the posture of the operator. A method to solve the above problems has been proposed by joint inventors of the present application in Japanese Patent Laid-Open Publication No. SHO 59-183428 laid open Oct. 18, 1984 and entitled "METHOD OF INPUT-OUTPUT COORDINATE TRANSFORMATION FOR INPUT INTEGRATED DISPLAY DEVICE" but this reference is not prior art.

A display device such as an LCD for use with an input/output integrated flat panel display, however, has two technical problems as compared with a CRT display: (1) there are some restrictions on the display area, and so it is difficult to obtain a highly precise and fine display type device and also it is difficult to obtain a large scale screen as the user desires; (2) it is not suitable for a multi-color display and is not applicable in sophisticated application fields, such as CAD/CAE (Computer Aided Design/Computer Aided Engineering).

Therefore, it is common to use, instead of the input integrated flat panel display alone, both the input integrated flat panel display and the highly precise and fine display type CRT for carrying out a subtle processing of handwritten characters or graphics. The reason for this is that the above problems can be solved at once by displaying a whole screen of data onto a highly precise and fine display type CRT display and by performing an input/output (display) operation, carried out for part of the whole screen (or for a partial screen), through an input integrated flat panel display.

With the system arrangement as mentioned above, a scrolling function for the input integrated flat panel display is indispensable in view of the display area and display resolution of the flat panel display. In addition, the man-machine performance is further improved if the apparatus is provided with a zooming function which changes the correspondence ratio between the display screens of the CRT display and the input integrated flat panel display. However, an input integrated flat panel display provided with scrolling and zooming functions has not yet been realized.

Conventional scrolling functions provided for a single display device other than an input integrated flat panel display are not convenient in use. That is, in general, instructions for scrolling are made by the operator by selecting and manipulating one of a plural buttons in accordance with the direction of scrolling the operator desires; the manipulation must be continued for the time proportional to the distance to be scrolled; and in order to set a desired direction for scrolling, a suitable combination of those buttons must be properly chosen. Furthermore, another system is known in which the coordinate input area and the scrolling instruction area are used in common and a mode change-over is necessitated. That is, in a scrolling instruction mode in such a system, a desired point is pointed to in order to display the corresponding area. Such system essentially requires a mode change-over so that the operations are cumbersome.

Further, apart from the problems described above, if the input integrated flat panel display can be used as one of the peripheral devices of a multipurpose personal computer and the like, it is possible to process handwritten characters or figures with ease and low cost by simply connecting the flat panel display to the conventional apparatus main frame. Thus, vast applications to not only professional users but also amateur end users are possible. In the case where the input integrated flat panel display is used as a peripheral device, since a typical personal computer or the like is provided as a display interface only with an interface (video signal line) for use in displaying on a CRT display, some modifications of the hardware of the personal computer main frame become necessary.

The present invention has been made in view of the above-mentioned prior art problems, particularly in view of the fact that the flat panel display serving as a display screen of an input integrated flat panel display has an insufficient display area and display resolution.

SUMMARY OF THE INVENTION

It is an object of the present invention to provide an input integrated flat panel display system in which part of a large screen (CRT display screen) larger than the display screen of an input integrated flat panel display can be displayed freely on the input integrated flat panel display and in which the coincidence between the coordinates of the input and output (display) can be attained.

It is another object of the present invention to provide an input integrated flat panel display system which is provided with a scrolling function and a zooming function.

It is another object of the present invention to provide an input integrated flat panel display system which can display part of a large screen (CRT display screen) using a video signal line for the CRT display.

In an input integrated flat panel display having, in an integrated form, an input device for inputting, through handwriting, characters, graphics, figures or points, and a flat panel display for displaying the input handwritings corresponding to the input coordinate information, the present invention aims at improving the man-machine performance by incorporating the following four means. In particular, there are provided a large screen frame memory for storing coordinate information of a large screen (CRT screen) larger than the flat panel display; a register for storing a start address; control means for controlling the transformation of the input coordinate information into the large screen coordinate information; and display control means for picking up part of the input coordinate information from the coordinate information of the large screen and for converting the part of the input coordinate information into the coordinate information of the flat panel display; wherein the transformation control means and the display control means are controlled by a bias value or start address.

Therefore, the contents of the frame memory of the large screen, which is larger than the display screen of the flat panel display, can be read out by the user from the input device of the input integrated flat panel display. In addition, the read-out contents of the large screen frame memory may be copied on the flat panel display of the input integrated flat panel display. As a result, the man-machine performance is greatly improved, while allowing the amateur end user to carry out processings of documents, graphics and the like.

A frame memory for exclusive use with the flat panel display may be provided in consideration of the differences between display refresh cycles of the large screen display and flat panel display.

BRIEF DESCRIPTION OF THE DRAWINGS

FIGS. 19(a) and 19(b) are views respectively showing points obtained while drawing strokes on the scroll appointment section of the input integrated flat panel display according to the third embodiment;

DESCRIPTION OF THE PREFERRED EMBODIMENTS

The embodiments of the present invention will now be described with reference to the accompanying drawings.

(1) Outline of Overall Arrangement of the Invention

Figure 1:
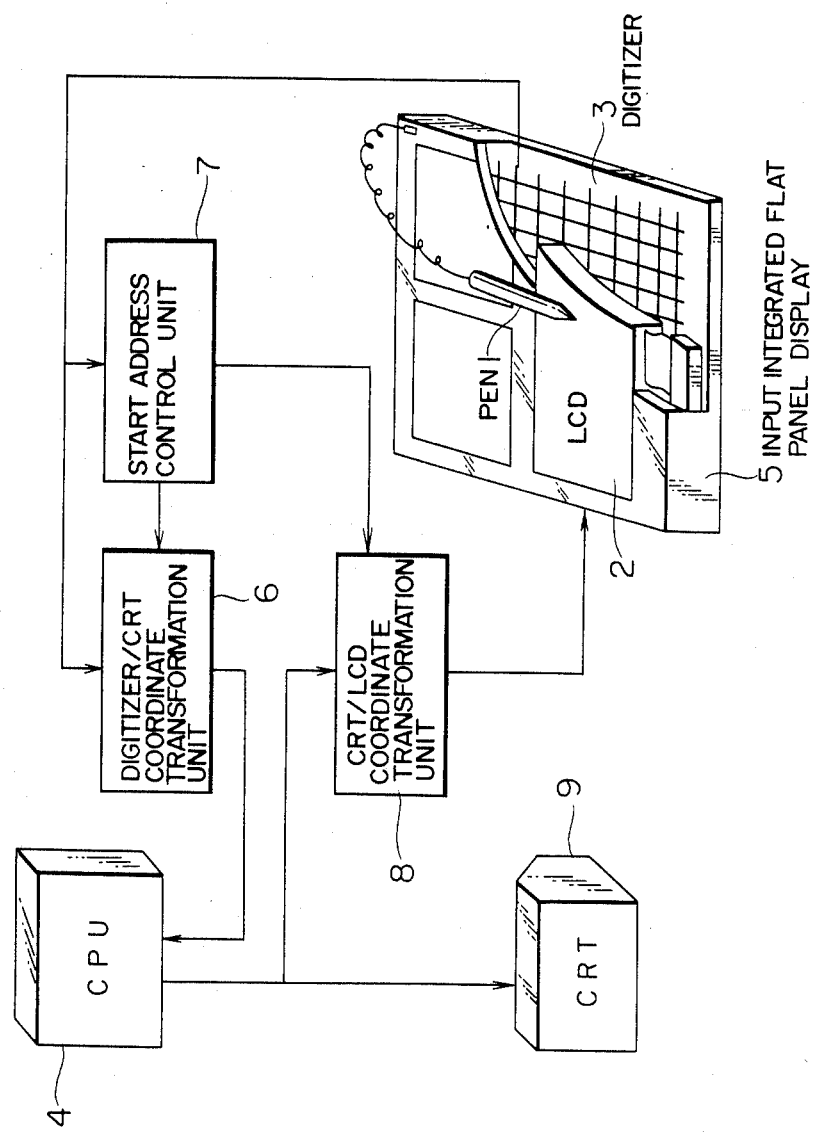
FIG. 1 is a diagram showing an overall construction of an input integrated flat panel display system according to the present invention.

In FIG. 1, numeral 1 represents a stylus pen for inputting a coordinate, numeral 2 represents a liquid crystal display or LCD, and numeral 3 represents an electromagnetic digitizer, these elements as a whole forming an input integrated flat panel display 5. The particular structure of the input integrated flat panel display 5 will be described later and is of an integrated structure in that the liquid crystal 2 as a display device and the electromagnetic digitizer 3 placed beneath the former are laid one upon the other. Since the liquid crystal display 2 can be manufactured thinner than 5 mm, the electromagnetic wave generated from the coordinate pen 1 in the form of a pulse magnetic field can be detected with the electromagnetic digitizer 3 even in the intermediate presence of the liquid crystal display 2 to a sufficient extent that the coordinate pointed out with the pen 1 can be read.

The area of the LCD 2 serving as a display section of the input integrated flat panel display 5 is smaller than that of a CRT display 9 having a large screen. Therefore, a scrolling function to move the displayed data on the display 5 is required.

The input coordinate of the electromagnetic digitizer 3 of the input integrated flat panel display 5 pointed out with the coordinate input pen 1 is transferred to a digitizer/CRT coordinate transformation unit 6 for transforming an input coordinate into a large screen frame memory coordinate and to a start address control unit 7. The digitizer input coordinate transferred to the digitizer/CRT coordinate transformation unit 6 is transformed into the CRT display screen coordinate and transferred to a processing unit main frame 4 (hereinafter referred to as CPU). The digitizer input coordinate is also transferred to the start address control unit 7 which transfers a start address (scroll appointment information) indicative of the start point on the screen to the digitizer/CRT coordinate transformation unit 6 and also to CRT/LCD coordinate transformation unit 8 forming part of the display control for transforming a large screen frame memory coordinate into a flat panel display coordinate.

The CPU 4 includes a frame memory for virtual large screen (not shown and also called a video memory) for storing information as to data to be displayed on the CRT display screen, which is a large screen. The input coordinate transformed into the CRT coordinate at the digitizer/CRT coordinate transformation unit 6 is written into the virtual large-screen frame memory. The display information written in the frame memory is transferred respectively to the CRT/LCD transformation unit 8 and CRT display 9. The display information is displayed on the LCD 2 after it is transformed into the output coordinate for the LCD at the CRT/LCD transformation unit 8 to thereby provide positional cornerdence between an input point and an output display point, while the display information transferred to the CRT display 9 is directly displayed.

In particular, according to the present invention, all accesses to the virtual large-screen frame memory are performed in the coordinate system for the large screen (e.g. CRT screen). After retaining the display on the CRT display 9, the write-in and read-out for the frame memory can also be attained through the input integrated flat panel display 5 having a smaller display screen. Furthermore, in practicing the present invention, various embodiments are presented such as in the case of independent use of the input integrated flat panel display or in the case of using the input integrated flat panel display as a peripheral device of the personal computer or the like.

(2) Structure of Input Integrated Flat Panel Display

Next, the structure of the input integrated flat panel display will be described. The input integrated flat panel display has an integrated structure in that the upper LCD and the lower electromagnetic coupling type digitizer are piled up one upon the other. The reason why the electromagnetic digitizer is placed beneath the LCD is that the LCD can be manufactured thinner than the electromagnetic digitizer. Thus, it is advantageous in that parallax is maintained at a minimum as compared with the case in which the digitizer is made transparent and is placed upon the display face (LCD). In addition, it is advantageous in that the display is not hindered by the existence of connection wires for use in detecting the input coordinate and that the material of the digitizer surface (for a pressure-sensitive digitizer) is not restricted. The structure described herein is disclosed in Japanese Patent Laid-Open Publication No. SHO 58-96339 entitled "COORDINATE READ-OUT AND DISPLAY DEVICE" and Japanese Patent Laid-Open Publication No. SHO 58-96337 entitled "COORDINATE READ-OUT AND DISPLAY DEVICE".

The electromagnetic coupling type digitizer referred to herein is a system in which the coordinate input pen is excited and the resultant pulse magnetic field is detected by a conductive wire group embedded in the digitizer. For example, DT-4010 electromagnetic coupling type digitizers manufactured by SEIKO ELECTRONICS COMPANY may be used. The detail of the principle is described in the Japanese article entitled "PRINCIPLE AND APPLICATIONS OF DIGITIZER" in "TRANSISTOR TECHNIQUES" published by CQ PUBLICATION company in May, 1983. By using such digitizers, it is possible to read the coordinate even if the pen is spaced 5 to 7 mm from the surface of the digitizer.

Figures 2, 3:
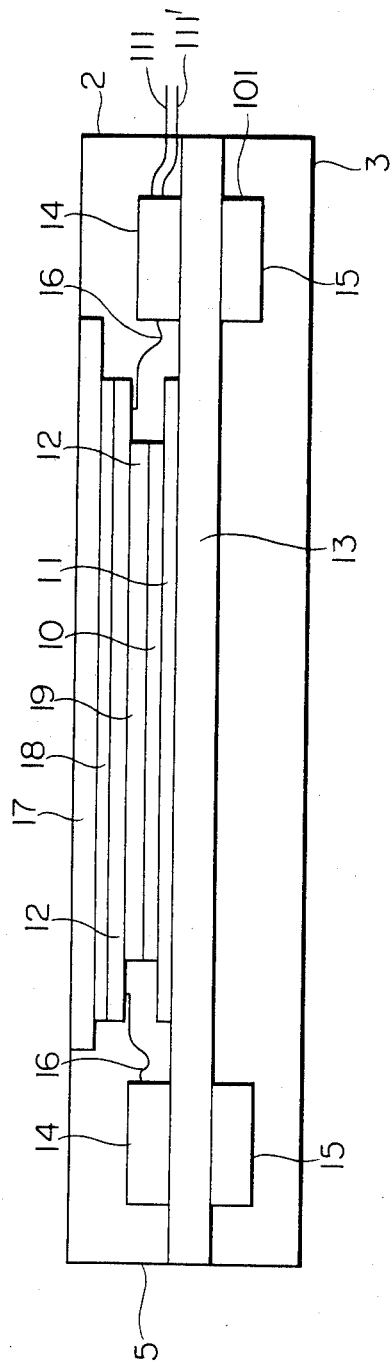
FIG. 2 is a transverse cross sectional view of the input integrated flat panel display.
FIG. 3 is a transverse cross sectional view showing the portion of the input integrated flat panel display where the LCD panel and the like are not included.

FIG. 2 shows a transverse cross sectional view of the input integrated flat panel display 5 comprised of the liquid crystal display 2 and the electromagnetic coupling type digitizer 3. The digitizer 3 includes a detection coil printed circuit board 13 and an input coordinate detection control circuit 15 (digitizer controller). On the digitizer 3, the LCD 2 is placed, which comprises a liquid crystal driver 14 (although described later, this includes liquid crystal common drivers 20 corresponding to CRT row drivers and liquid crystal column drivers 21), liquid crystal element 19, polarization plates 10 and 18, reflection plate 11, liquid crystal panel 12 and the like. Numeral 16 represents a flexible printed wiring board. A twisted-nematic device is used as a liquid crystal element and a reflection type liquid crystal display device is formed by incorporating the reflection plate 11. By the provision of a transparent surface protective plate 17 for protecting the surface of the upper polarization plate 18, scratches on the polarization plate 18 which might be caused by repetitive input accesses with the coordinate input pen 1, can be avoided. With the structure as described above, the distance between the surface which the tip of the coordinate input pen 1 contacts and the display surface 19 (liquid crystal element) can be made small so that the influence of parallax is suppressed to the minimum. Numeral 101 represents a signal line for transferring the input coordinate from the digitizer controller 15, and numeral 111 (111′) represents a signal line connected to the liquid crystal driver 14 so as to drive the liquid crystal element 19.

A comparison of the present system with the normally used liquid crystal module is here given. Most of the conventional common liquid crystal modules are constructed in such a way that the liquid crystal driver 14 is positioned beneath the liquid crystal panel. However, in order to detect the magnetic field generated from the coordinate input pen 1 with the detection coil printed board 13 of the electromagnetic coupling type digitizer, the distance between the magnetic field generating and detecting positions must be shorter than 5 mm. Further, if there exists a liquid crystal driver 14 and the like intermediate of the two positions, noises are produced. As a solution to the above, as shown in FIG. 2, the liquid crystal driver 14 is positioned at the sides of the liquid crystal panel 12 by using the flexible printed wiring board 16. By doing so, the distance from the surface protective plate 17 to the reflection plate 11 should be shorter than 5 mm to makes it possible to effectively detect a pulse magnetic field.

A transverse cross sectional view of the portion where the liquid crystal panel 12 and the like are not present is shown in FIG. 3. Also at the portion including the liquid crystal panel 12 and the like shown in FIG. 2, the digitizer 3 for inputting the coordinate is positioned in juxtaposition to the surface of the flat panel display 5 in order to make handwriting input easy.

Figure 4:
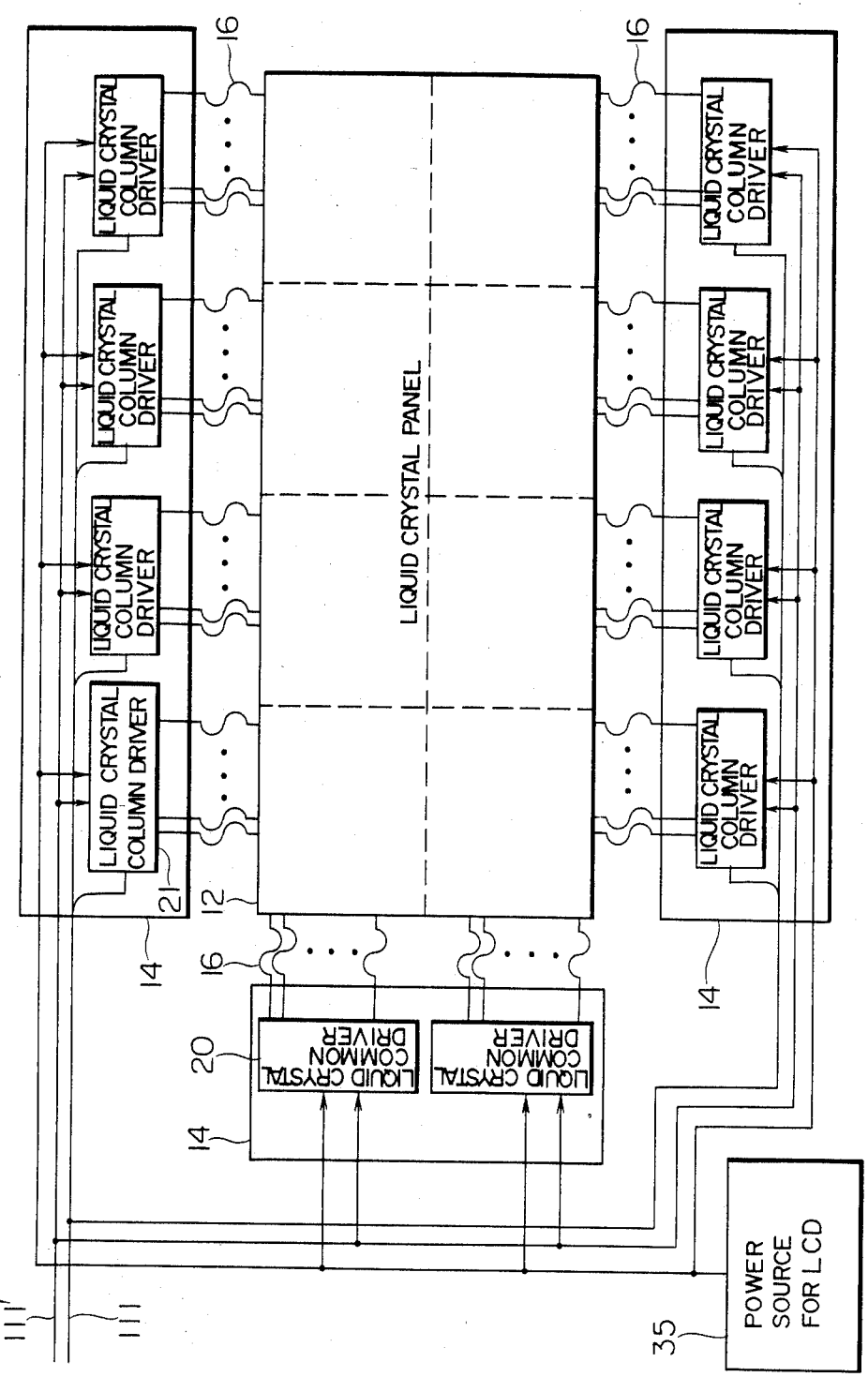
FIG. 4 is a lateral cross sectional view of the input integrated flat panel display.

FIG. 4 shows a lateral cross sectional view of the input integrated flat panel display 5. Aside from the liquid crystal panel 12, the liquid crystal driver 14, i.e., liquid crystal common (row) drivers 20 and liquid crystal column drivers 21, are mounted and connected through the flexible printed wiring board 16. The liquid crystal panel 12 drives its liquid crystal elements through a multiplexing drive. If a frame frequency is set about 70 Hz, the liquid crystal panel 12 must be divided into eight blocks due to a low response speed of the liquid crystal elements. For this reason, two liquid crystal common (row) drivers 20 for driving in the Y-direction and eight liquid crystal column drivers 21 for driving in the X-direction are respectively used so as to display and control each block. Clock signals 11′ are delivered to the common (row) drivers 20 and column drivers 21, while liquid crystal display signals 111 are independently delivered to respective ones of eight liquid crystal column drivers 21. Numeral 35 represents a power source for the LCD, which is supplied to the common (row) drivers 20 and column drivers 21, respectively.

The connection between the liquid crystal panel 12 and the liquid crystal driver 14 is effected using the flexible printed wiring board 16 so that the liquid crystal driver can be mounted beside the liquid crystal panel 12.

(3) First Embodiment of the Invention

The first embodiment of the invention will be described with reference to FIG. 5. In the figure, elements designated by the identical numerals to those in FIG. 1 operate to perform the same functions.

The first embodiment uses an input integrated flat panel display and a CRT display in combination. The frame memory for the CRT display is separately provided so as to provide a display on the CRT display. In this case, as seen from the above description, by pointing with the pen to the coordinate on the liquid crystal display of the input device of the input integrated flat panel display, it is possible to identify the display screen coordinate on the CRT display of a large screen. Scrolling and zooming functions are also referred to hereinafter.

Figure 5:
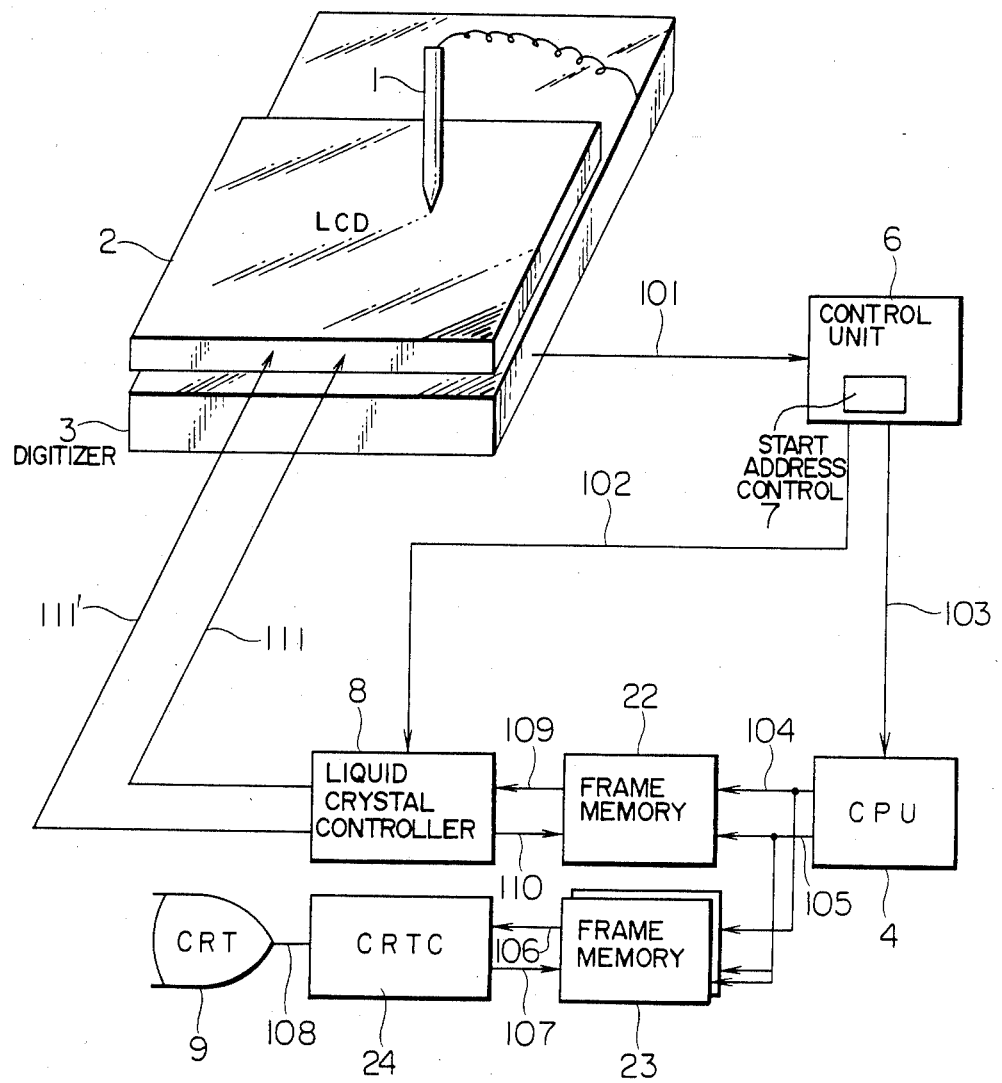
FIG. 5 is a diagram showing an overall construction of the system according to a first embodiment of the present invention.

Referring to FIG. 5, the overall flow of the system operation will be described in brief. The electromagnetic digitizer 3 detects a coordinate pointed out by the coordinate input pen 1, and the detected two-dimensional coordinate (X, Y) is transferred to the coordinate transformation control unit 6 of the input integrated flat panel display via the signal line 101. Although the liquid crystal display 2 is positioned intermediate the coordinate input pen 1 and the digitizer 3, since the thickness is smaller than 5 mm, the electromagnetic wave radiated from the pen 1 can reach the digitizer 3 and the pointed-out coordinate can be read out. In the present embodiment, the liquid crystal display is composed of 640×256 pixels.

The coordinate (X, Y) input to the digitizer 3 and transferred to the coordinate transformation unit 6 of the input integrated flat panel display is transformed from the digitizer coordinate system into the CRT coordinate system. The transformed coordinate is transferred as scrolling or zooming display control signals to the liquid crystal controller 8 via a signal line 102, and the two-dimensional coordinate (x, y) transformed to the CRT coordinate system is transferred to the processing unit main frame 4 (CPU) via a signal line 103. The detailed description of the operations of this circuit portion will be described later with reference to FIG. 6.

The processing method for the coordinate (x, y), to be carried out at the CPU 4, varies with the mode at a given time. Since the processing method is the same as for the combination of a conventional digitizer and a CRT display, the most simple case will be described here in which the input coordinate (x, y) is displayed by means of echo-back.

Upon reception of the coordinate (x, y), the CPU 4 delivers to frame memories 22 and 23 a write-in address via address lines 104 and write-in data via data signal lines 105. The frame memory 22 is a large screen memory providing one bit for one pixel for storing a pattern output to the liquid crystal display. The frame memory 23 is a memory for storing a pattern output to the CRT and stores a number of bits for each pixel, corresponding to the number of colors feasible for the output. The CRT display 9 used in the present embodiment is assumed to display 1280×1024 pixels so that the frame memories each have a memory capacity of 1280×1024 pixels.

A CRT display circuit 24 (CRTC) reads out the contents of the frame memory 23 in synchronization with the refresh cycle of the CRT 9. To this end, the CRTC 24 outputs an address of the frame memory 23 onto a signal line 107 and receives the read-out data from a signal line 106, thereby outputting the data to the CRT 9 as a video signal 108. The CRT display circuit 24 may be a known type (such as an LSI type CRT controller HD6845 manufactured by HITACHI LTD.).

The liquid crystal controller 8 reads out necessary data from the frame memory 22 for the liquid crystal display and coordinate-transforms from the CRT coordinate to the liquid crystal coordinate so as to provide a display on the liquid crystal display 2. In particular, the liquid crystal controller 8 outputs an address of the frame memory 22 onto a signal line 110, and receives the read-out data from a signal line 109 to thereby deliver the read-out data to the liquid crystal 2 via the signal line 111 (111') (the signal line 111 (111') is used for driving the liquid crystal driver 14 as shown in FIGS. 2 and 4). The liquid crystal display 2 receiving the data displays the contents of the frame memory so that the operator can observe the displayed information at the position corresponding to that input with the coordinate input pen 1.

Figure 6:
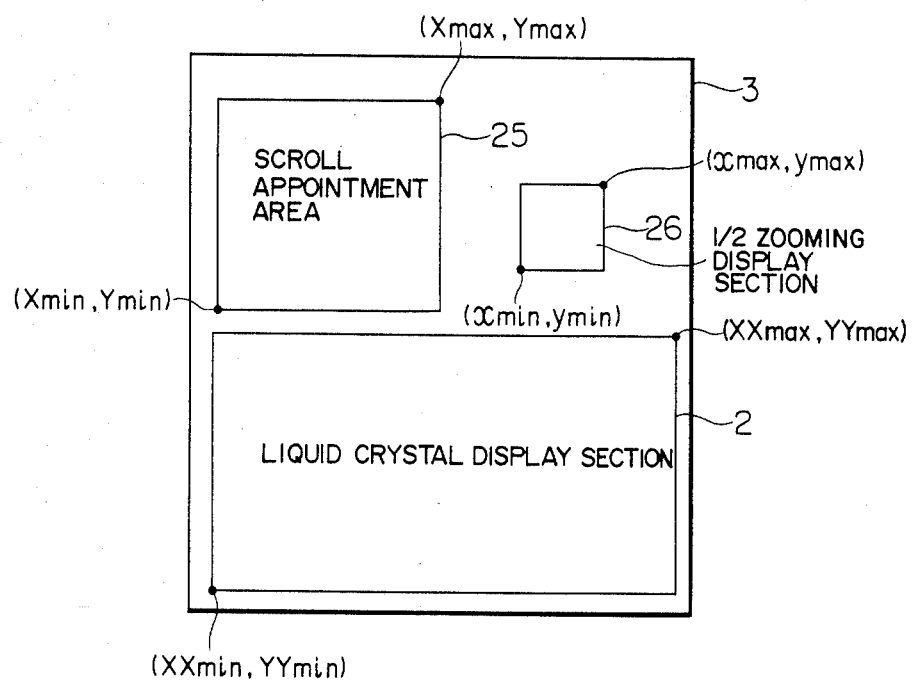
FIG. 6 is an outer appearance of the input surface of the input integrated flat panel display unit according to a first embodiment of the present invention.

Next, an exemplary outer appearance of an input face of the input integrated flat panel display is shown in FIG. 6. The digitizer 3 has a larger dimension than the liquid crystal display section, since the upper portion of digitizer 3 has a coordinate appointment area for scrolling and a display screen control section for ½ zooming reduction) display and the lower portion of has the coordinate appointment section for the liquid crystal display 2. In FIG. 6, numeral 2 represents the liquid crystal display section, numeral 25 represents the scrolling appointment area, and numeral 26 represents the ½ zooming display section. The scroll appointment area 25 and ½ zooming display section 26 are provided for improving the man-machine performance of the input integrated flat panel display in consideration of the fact that the display area of the input integrated flat panel display is smaller than that of the CRT.

Figure 7:
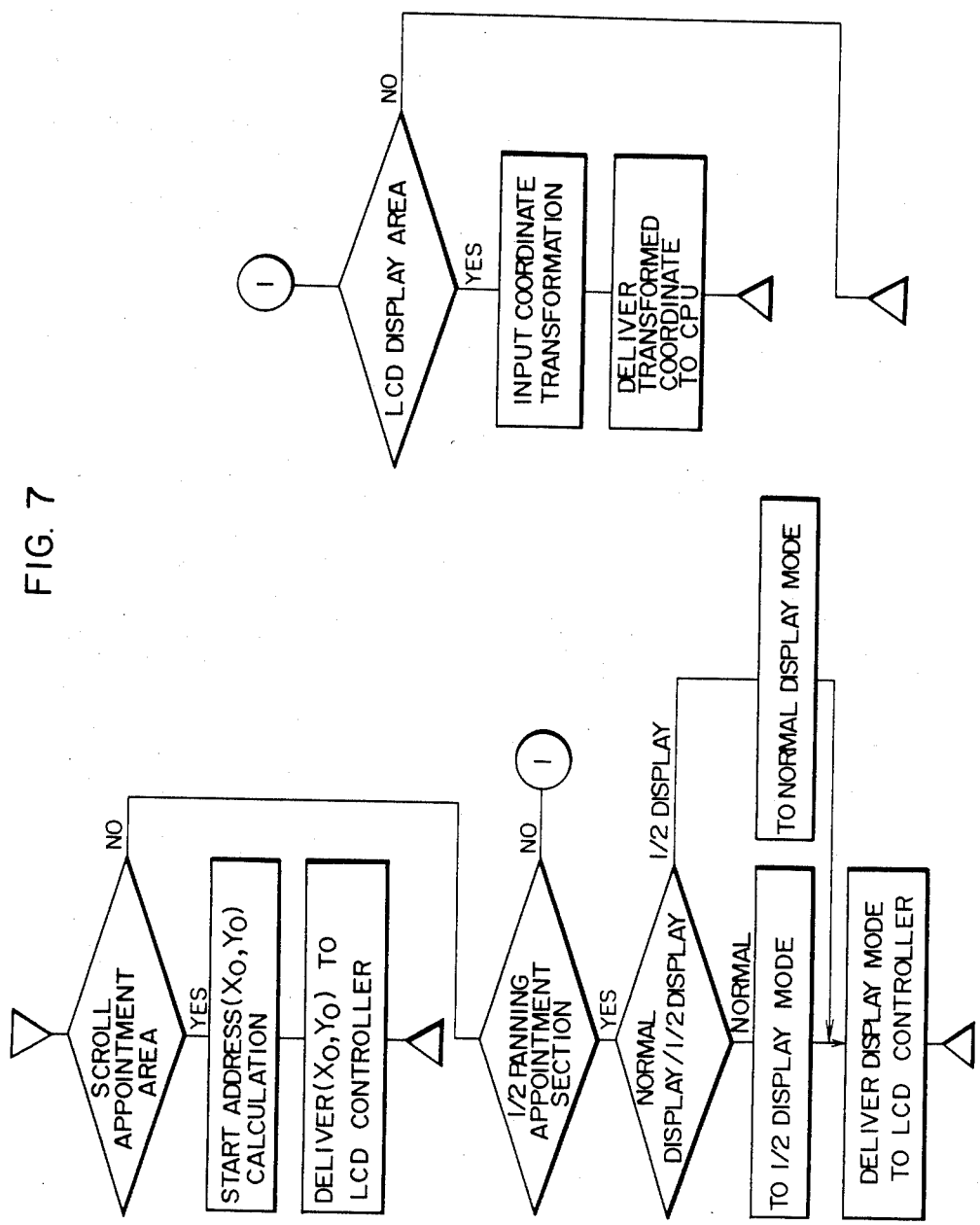
FIG. 7 is a flow chart for explaining the operations of the control unit of the input integrated flat panel display system according to the first embodiment.

Next, referring to the flow chart of FIG. 7, the control unit 6 of the input integrated flat panel display will be described. The digitizer coordinate (X, Y) input through the signal line 101 is checked to determine whether it is within the scroll appointment area 25 or not. This means to check whether the value of (X, Y) is within the value from ($X_{min}$, $Y_{min}$) to ($X_{max}$, $Y_{max}$). The digitizer coordinate (X, Y) in FIG. 6 is defined by assuming the lower left as (0, 0), the range being within $0 \leq X \leq 7679$ and $0 \leq Y \leq 7679$.

If the coordinate (X, Y) is within the scroll appointing area 26, the coordinate transformation is performed in accordance with the following equations, $$X_0 = 1280 \cdot \frac{X - X_{min}}{X_{max} - X_{min}} \quad (1)$$

$$Y_0 = 1024 \cdot \frac{Y - Y_{min}}{Y_{max} - Y_{min}} \quad (2)$$

Through the coordinate transformation, the values of ($X_0$, $Y_0$) are respectively normalized within $0 \leq X \leq 1280$ and $0 \leq Y \leq 1024$. The numbers 1280 and 1024 correspond to the number of dots of the CRT display. The coordinate ($X_0$, $Y_0$) indicates the upper left point (start address) on the liquid crystal display. In the normal display, the area corresponding to that divided by both end points ($X_0$, $Y_0$) and ($X_0-255$, $Y_0-639$) is displayed on the liquid crystal display screen by transferring the start address ($X_0$, $Y_0$) to the liquid crystal controller 8 via the signal line 102.

Alternatively, if the digitizer coordinate (X, Y) is on the ½ zooming display section 26, that is, the coordinate (X, Y) is within the range from $X_{min}$, $Y_{min}$ to ($X_{max}$, $Y_{max}$), is then the display mode at that time is changed:

(1) in the case of the normal display mode, the mode is changed to the ½ zooming display mode; and (2) in the case of the ½ zooming display mode, then the mode is changed to the normal display mode.

The coordinates ($X_0$, $Y_0$) and the display mode are stored in the control unit 6 of the input integrated flat panel display and also transferred to the transformation controller 8.

If the digitizer coordinate (X, Y) corresponds to the area of the liquid crystal display section 2, that is, in the case where the coordinate (X, Y) is within the range from ($XX_{min}$, $YY_{min}$) to ($XX_{max}$, $YY_{max}$), then in order to transform the input digitizer coordinate (X, Y) into the coordinate (x, y) of the frame memory 22, the following calculation is executed, $$\begin{pmatrix} x \\ y \end{pmatrix} = M \cdot \begin{pmatrix} a & 0 & b \\ 0 & c & d \end{pmatrix} \begin{pmatrix} X \\ Y \\ 1 \end{pmatrix} + \begin{pmatrix} X_0 \\ Y_0 \end{pmatrix} \quad (3)$$

where a, b, c, and d represent predetermined constants for use in transforming the digitizer coordinate system into the liquid crystal display system, ($X_0$, $X_0$) represents the coordinate given on the scroll appointment area, and M represents a constant which is 1 for the normal display and 2 for the ½ zooming display. The obtained coordinate (x, y) corresponds to the coordinate on the CRT screen.

Figure 8:
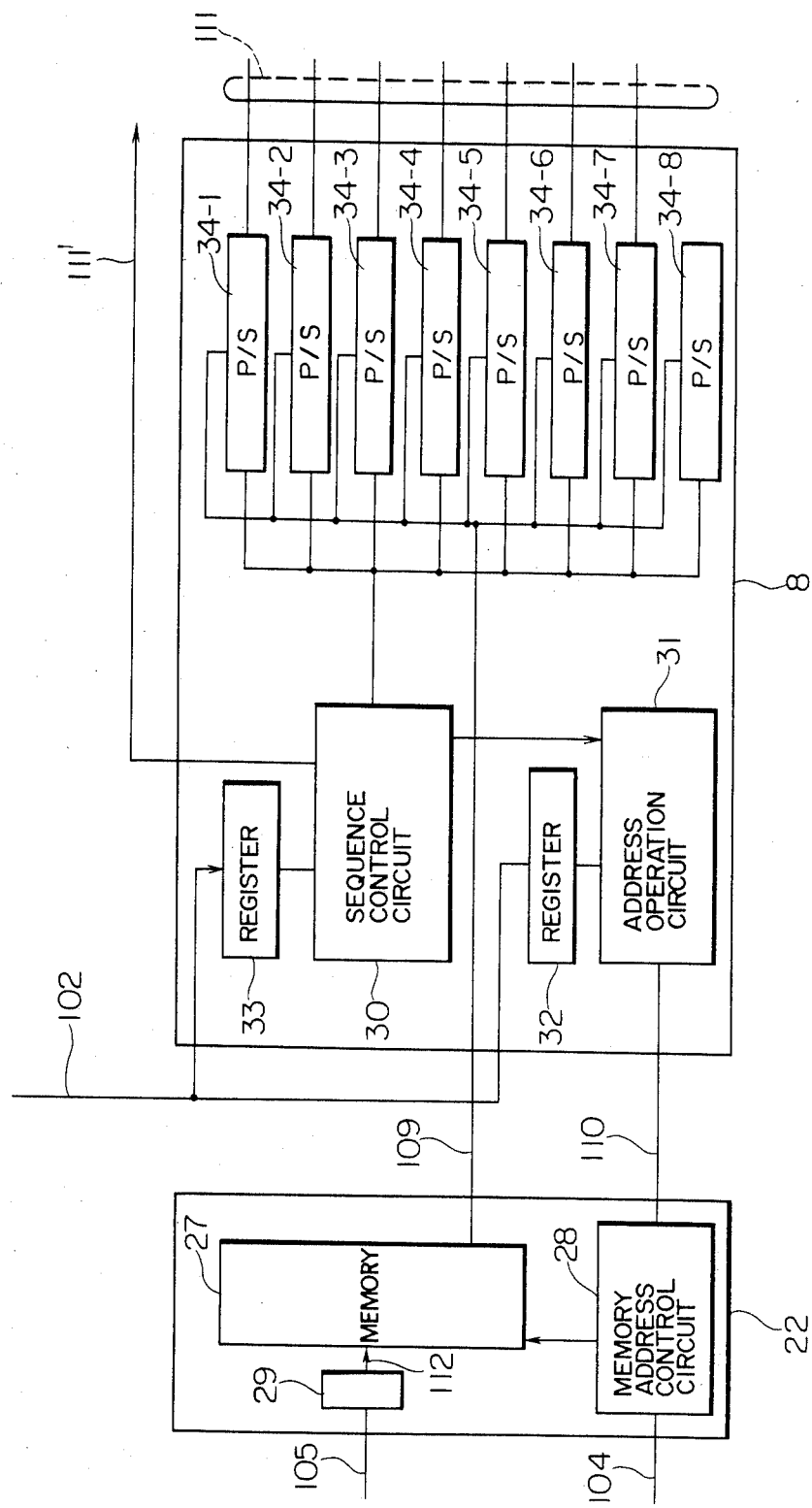
FIG. 8 is a block diagram of the frame memory and LCD controller in the first embodiment.

FIG. 8 shows a detailed block diagram of the frame memory 22 and the transformation controller 8. The frame memory 22 comprises a memory address control circuit 28 for controlling memory accessings from the CPU 4 and transformation controller 8 in time division, a memory 27, and an arithmetic and logic operation circuit 29 for calculating data 105.

The memory 27 can be accessed from the CPU 4 with the aid of a frame memory address 104 and by way of a data write-in signal line 105, the memory 27 storing the display data of 1280×1024 pixels.

Data 105 is composed of a plural bit arrangement since the CRT can produce a color display, while on the other hand the frame memory 22 is composed of one bit arrangement since the liquid crystal display is used. Therefore, at the arithmetic operation circuit 29, the plural bit arrangement is changed into a one bit arrangement. Although various constructions can be thought of for the arithmetic and logic operation circuit 29, in order not to lose any information. In the present embodiment a logical sum is first obtained and then outputted onto a signal line 112.

Out of the data of 1280×1024 pixels made up on the frame memory 27 by the CPU 4, the transformation controller 8 controls transfer of the data of 640×256 pixels appointed by the user to the liquid crystal display 2.

Registers indicating which portion out of the 640×256 pixels to be selected, include a register 32 indicating the start address ($X_0$, $Y_0$) at the upper left point on the display, and a register 33 indicating the ½ zooming display mode. The contents of the two registers may be alterably changed by the control unit 6 of the input integraed flat panel display via the bus 102. In this embodiment, the start address control unit 7 in FIG. 1 is built in the control unit 6, from which the start address is written into the register 32.

In order to perform the 640×256 pixel display on the liquid crystal display section 2, it is necessary to transfer serial data to the eight blocks for every 160×128 pixels. Thus, the accesses to the frame memory 22 must be carried out in conformation to the above requirements. In particular, assuming that the lower left point has a coordinate (0, 0), the frame memory 22 is divided into eight blocks each defined by a pair of apexes of a diagonal, i.e., {(0, 255), (159, 128)}, {(160, 255), (319, 128)}, {(320, 255), (479, 128)}, {(480, 255), (639, 128)}, {(0, 127), (159, 0)}, {(160, 17), (319, 0)}, {(320, 127), (479, 0)}, and {(480, 127), (639, 0)}.

For this reason, eight parallel to serial conversion circuits 34 for delivering serial data respectively to eight blocks are included in the transformation controller 8 wherein data output one bit after another from the parallel to serial conversion circuit 34 is transferred to the liquid crystal display section 2 via the data line 111.

Figure 9:
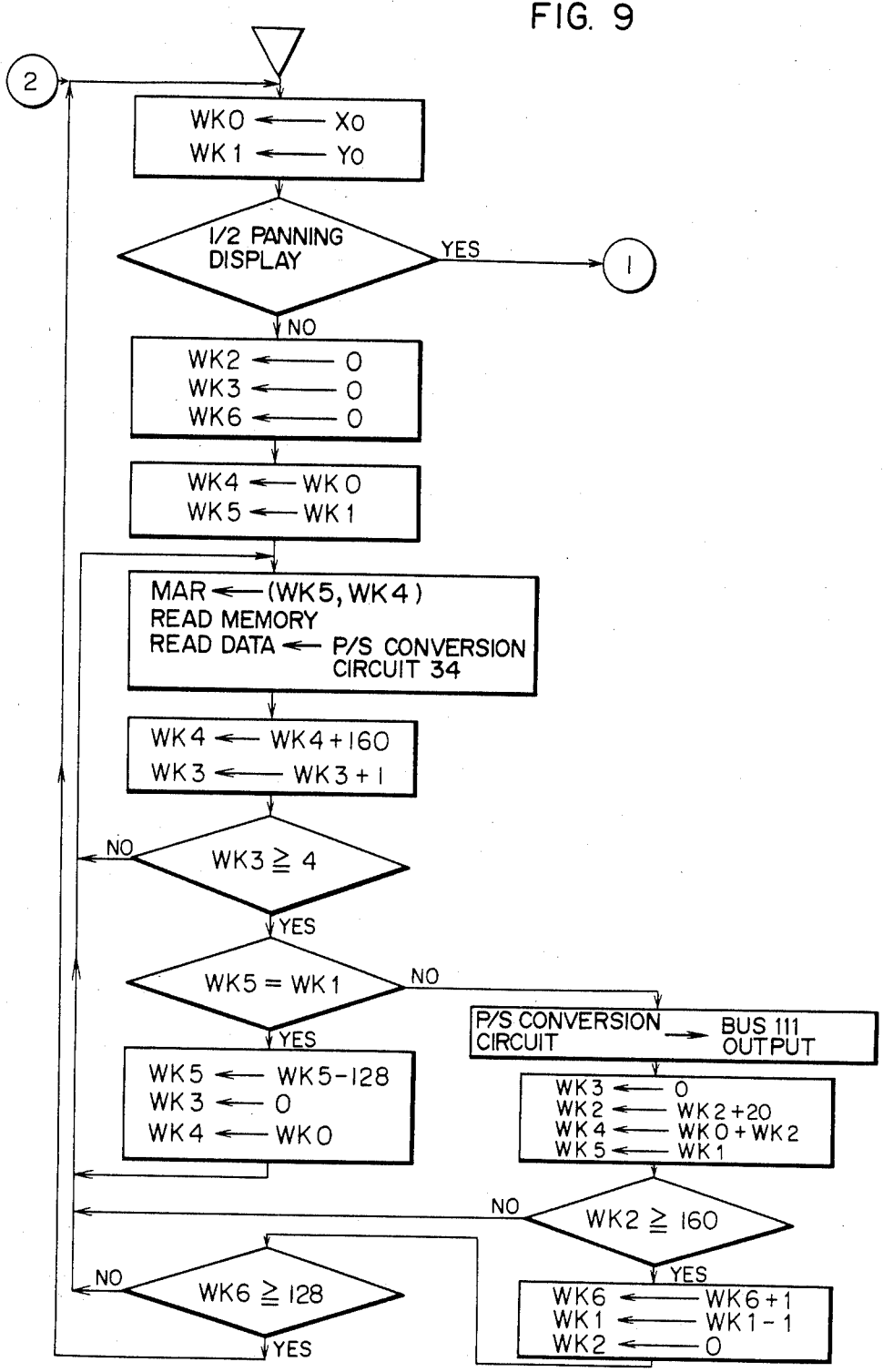
FIG. 9 is a flow chart for explaining the operations of the LCD controller in the first embodiment.
Figure 10:
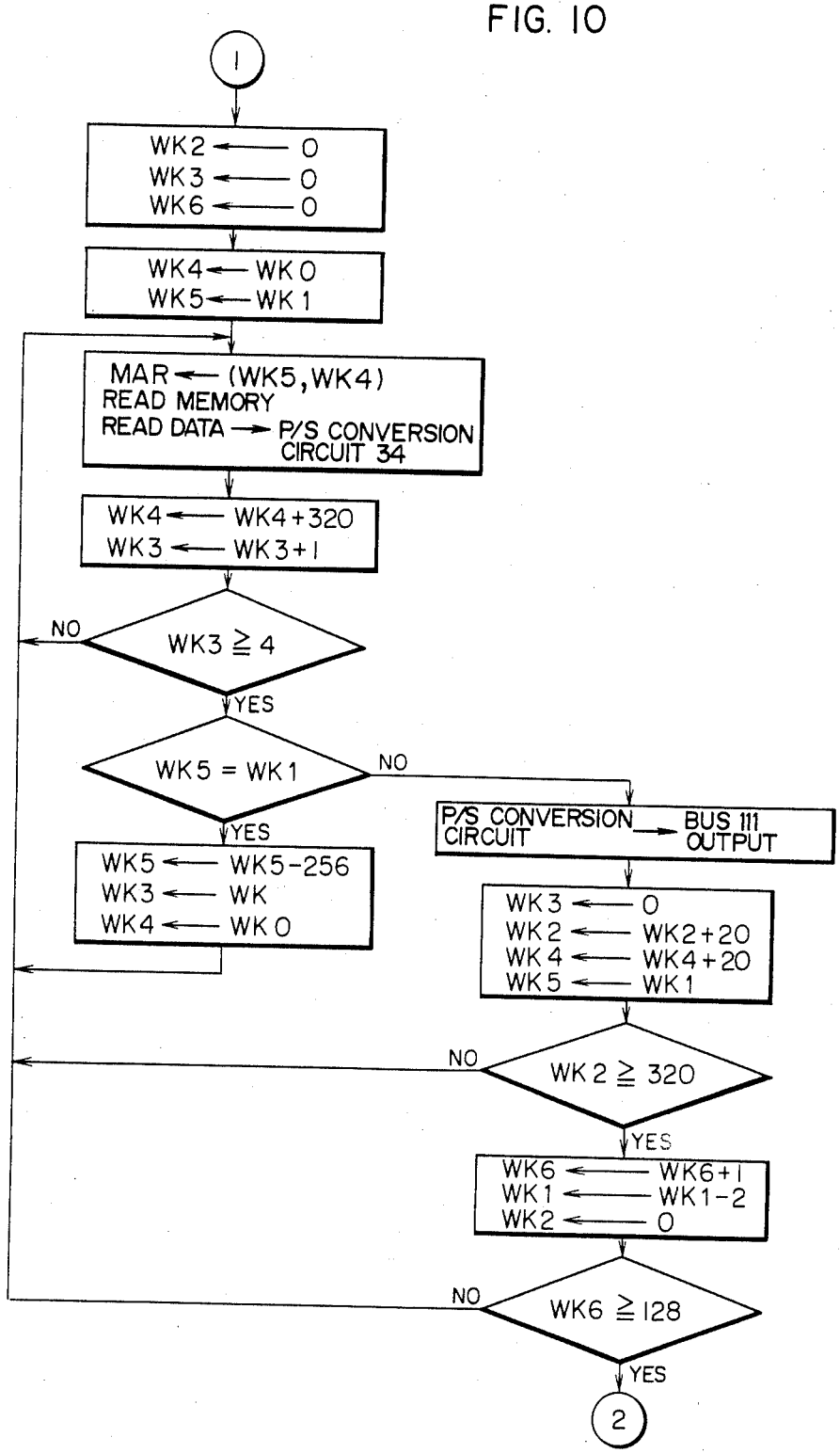
FIG. 10 is a similar flow chart for explaining the operation of the LCD controller in the first embodiment.

The operation of the transformation controller 8 will be described hereinafter in accordance with the control flow shown in FIGS. 9 and 10.

First, the start address ($X_0$, $Y_0$) is set at work registers WK0 and WK1 in an address operation circuit 31. Next, the output from the register 33 is checked with a sequence control circuit 30 to determine whether the output indicates the ½ zooming display mode or not. In the case of the normal display mode, after 0's are set at loop check registers WK2, WK3 and WK6, the registers (WK0, WK1) having the values of ($X_0$, $Y_0$) are set as (WK4, WK5).

Thus, the frame memory 22 is accessed and the read-out twenty bits are delivered through a bus 109 be set in the parallel to serial conversion circuit 34-1.

Next, the register WK4 indicative of the address in the X direction is renewed by +160 so as to indicate the next block, and similarly to the above the memory is accessed to set the contents in the parallel to serial conversion circuit 34-2.

After repeating the above processings four times, a register WK5 indicative of the Y direction address is renewed by −128 to thereby perform the memory accesses corresponding to the lower four blocks and set the read-out data at the parallel to serial conversion circuits 34-5 to 34-8.

After all of the data is read out, then the 20-bit data is converted into serial data to output it onto the bus 111. The signal line 111' is for providing the timings of the bus 111 to the liquid crystal display section 2.

After transfer of the 20 bit pixels, in order to obtain the following 20 bit address in the X-direction, the register WK4 is set with the value WK0+WK2 so as to enable the setting of the value X+20.

The newly set address information in the registers WK4 and WK5 is used in reading out the data of the eight blocks similarly to the above, and the read-out data is transferred to the liquid cyrstal display section. The operation is repeated eight times, that is, until the register WK2 reaches 160, thereby attaining the two raster display beginning with ($X_0$, $Y_0$) and ($X_0$, $Y_0-128$).

Further, by setting the start address ($X_0$, $Y_0-1$) as ($X_0$, $Y_0-1$), the next raster is displayed. By repeating these operations 128 times, the whole screen of (640×256) pixels are displayed.

In the case of the ½ zooming display, every other pixel in both X- and Y-directions are omitted in the data to be displayed. Therefore, the differences in operation as compared to the 1/1 (normal) display are that the parameters for the address operation are set to be twice as large and that at the parallel to serial conversion circuit 34, data omitting every other pixel among the 20 pixels is outputted onto the bus 111. Thus, the 1280×512 pixels on the frame memory 22 are displayed as the 640×256 pixels on the liquid crystal display section.

Depending upon the setting of the start address ($X_0$, $Y_0$), if ($X_0+639$, $Y_0-255$) in the normal display and ($X_0+1278$, $Y_0-510$) in the ½ reduction display exceed the frame memory coordinates (0, 0) and (1279, 1023), then 0's are caused to be inputted.

According to the above embodiment, it is possible to display as desired, part of the CRT screen on the input integrated flat panel display. Furthermore, it is possible to realize an input integrated flat panel display in which the input and output coordinates can be made to coincide with each other by indicating with a pen point on the flat panel display screen.

(4) Second Embodiment of the Invention

The second embodiment of the present invention will now be described in connection with FIG. 11. The present invention is particularly suitable for performing scrolling and zooming functions as described in the first embodiment. The construction of this embodiment involves only the input integrated flat panel display and does not use the CRT display in combination therewith. In the embodiment, elements represented by the identical numerals perform the same functions as of those in the first embodiment.

A brief description of the embodiment will now be given in the following.

In order to provide the scrolling function and zooming function, information indicative of which part of the frame memory storing the large screen is to be processed, i.e., a start address (the least number address of the frame memory displayed on the flat panel display), is stored in a register in the CPU 4. If a scroll appointment or display is commanded from the input section, the input data is written into the corresponding frame memory depending on the start addresses stored in the start address register of CPU 4 by causing the system to rewrite the respective two start addresses. In order to dispaly data on the display section, it is possible to perform the display by reading out data from the frame memory in accordance with the start address stored in the display controller. As above, the user can expect correct and quick processings while he instructs a scrolling or zooming display in association with the large screen and gives a hand-writing input or point input of an icon.

Furthermore, it is unnecessary for the user to always keep in mind in which part of the large screen the presently displayed portion located. By virtue of the system in which a display screen can be scrolled in accordance with the direction, distance, and speed of a stroke given on the scroll appointment section for displaying such location as desired by the user, it is possible to provide the input integrated flat panel display system with a high man-machine performance.

The second embodiment of the present invention will now be described with reference to the accompanying drawings.

Figure 11:
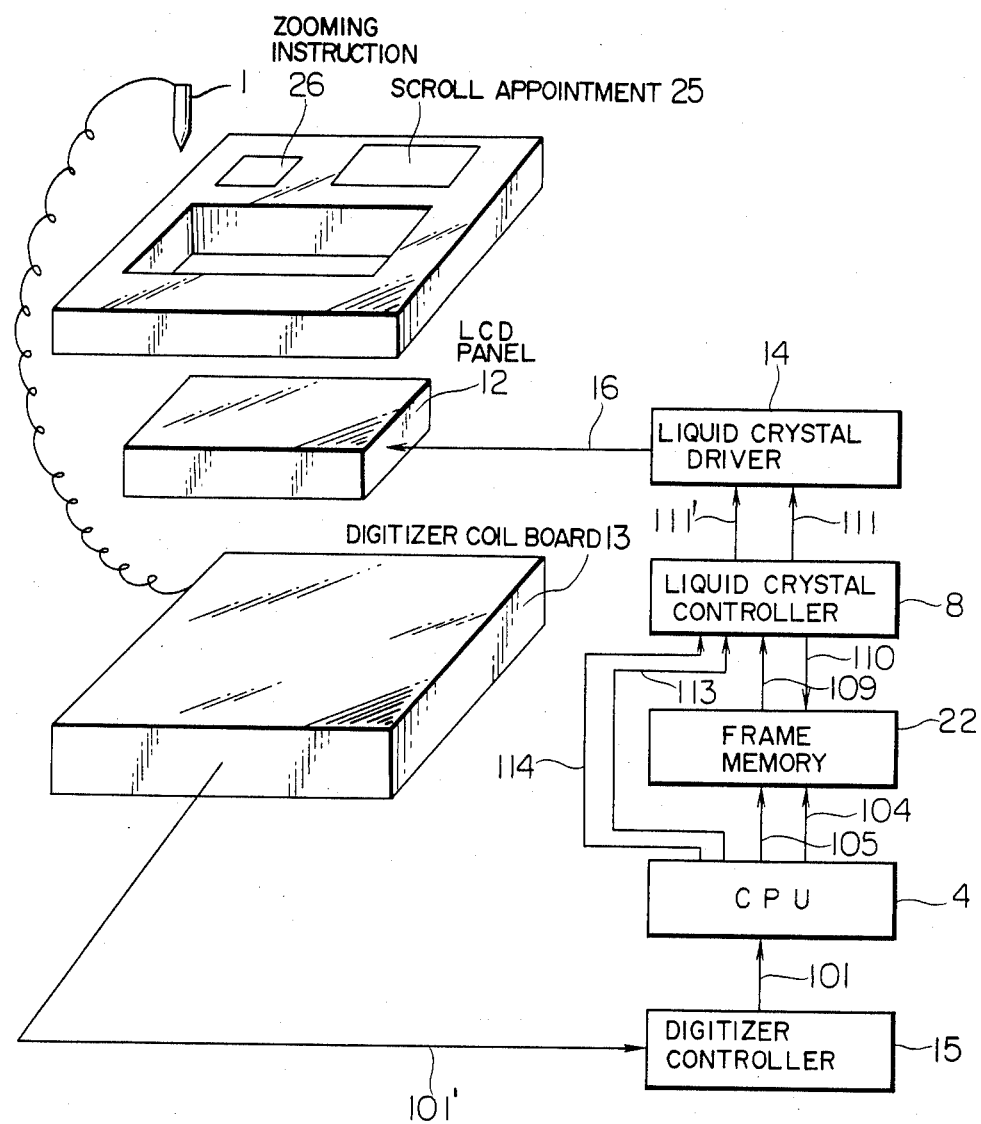
FIG. 11 shows an overall arrangement of a second embodiment according to the present invention.

In FIG. 11, numeral 12 represents a liquid crystal panel as a display section which serves as an input section for hand-written characters or graphics. Numeral 13 represents a detection coil printed board of an electromagnetic coupling type digitizer for detecting coordinates. In the present embodiment, there are additionally provided a scroll appointment section 25 for moving part of the large screen stored in the frame memory 22 and displaying part of the large screen, and a zooming display instruction section 26 for instructing a zooming display by which the overall position of the large screen can be recognized at a glance. First, any desired position on the input section is indicated with the coordinate input pen 1. Then, the magnetic field passing through the liquid crystal display panel 12 can be detected by the detection coil printed board 13 of the digitizer. The detected signal is converted into an input coordinate through a tablet (digitizer) controller 15 in the CPU 4 (which includes the control unit 6 and the start address control unit 7), the input coordinate being processsed in the CPU 4, e.g., being written in at the corresponding point in the frame memory 22. The liquid crystal controller 8 transforms data in the frame memory 22 into a liquid crystal display signal. The liquid crystal driver 14 receiving the signal displays information at the corresponding coordinate position on the liquid crystal panel 12. In the case where the zooming display is instructed, the zooming display command and start address are transferred to the liquid crystal controller 8 via a zooming and start address signal line 113, and the information in the frame memory 22 is received at the transformation controller 8 to convert it into a liquid crystal display signal. Further, a scroll appointment signal is transferred to the transformation controller 8 via the same zooming and start address signal line 113, and the transformation controller 8 calculates the memory address of the frame memory and reads out information corresponding to the calculated address 22 from the frame memory 22 to convert it into a liquid crystal display signal and transfer the liquid crystal display signal to the liquid crystal driver 14.

Figure 12:
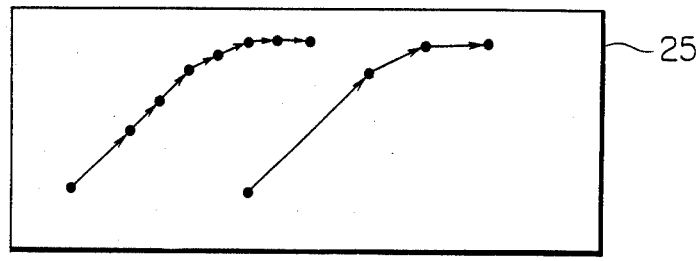
FIG. 12 is a view showing points obtained while drawing strokes on the scroll appointment section of the input integrated flat panel display unit in the second embodiment.

In requesting a scroll operation, the direction and distance of the scroll can be instructed by drawing a stroke on the scroll appointment section 25. For example, as shown in FIG. 12, if points on the stroke given on the scroll appointment section 25 are detected with the detection coil printed board 13 of the electromagnetic coupling digitizer, the position displayed on the large screen is moved in the direction and by the distance respectively corresponding to those of the stroke line whose respective start and end points are adjacent the two detected points. Since the timings of the digitizer for detecting the signal are constant, if a stroke is drawn on the scroll appointment section 25 at a high speed, then the number of detected points per one stroke becomes small (right side of FIG. 12) and hence the scroll of the display becomes quick. Alternatively, if a stroke is drawn slowly, then the number of detected points becomes large (left side of FIG. 12) and hence the scroll of the display becomes slow.

Figure 13:
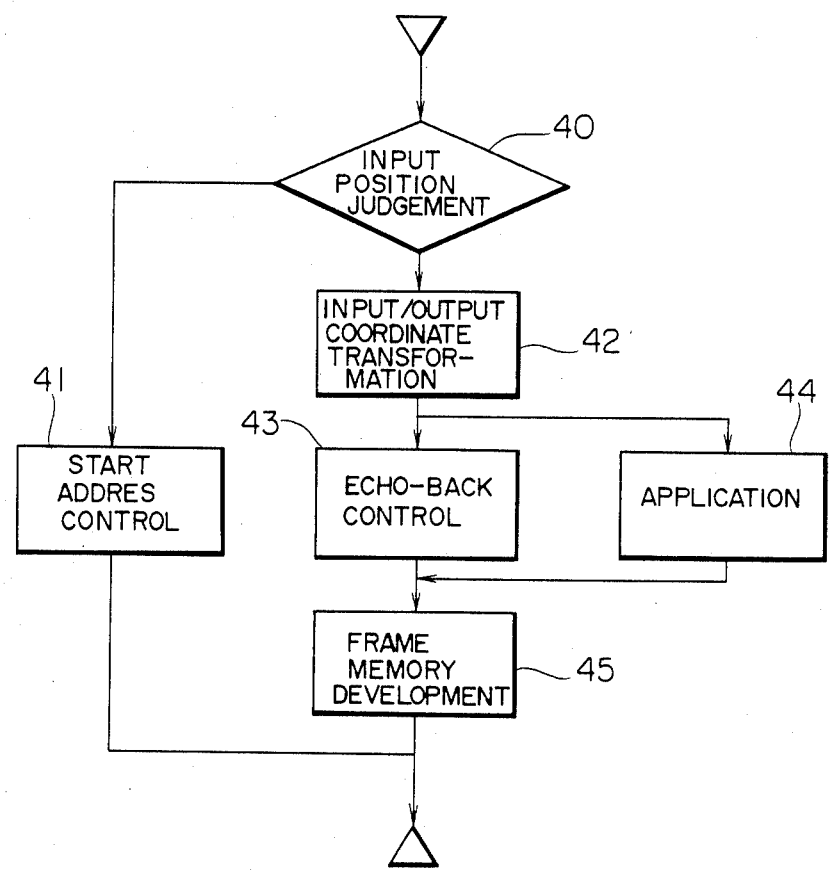
FIG. 13 is a flow chart for explaining the processings of the processing device in the second embodiment.

FIG. 13 shows the processing flow of the input coordinate at the CPU 4. First, the content of the input position transferred from the digitizer controller 15 of the electromagnetic coupling type digitizer is subjected to a judgement operation 40. If the input coordinate is within the area of the scroll appointment section 25, then the input coordinate is transferred to a start address control 41, whereby information (start address) indicative of the display area is transferred to the transformation controller 8 via the start address signal line 113. The start address here means the least address of the frame memory within the portion to be displayed. Alternatively, if the input coordinate transferred from the digitizer controller 15 of the electromagnetic coupling type digitizer is within the area of the zooming display section, then at a start address control 41, the zooming command and start address are transferred to the transformation controller 8. In the case where the input coordinate transferred from the digitizer is within the area of the input section (liquid crystal panel 12), the input coordinate (X, Y) is transformed into an output coordinate (x, y) at an input coordinate/output coordinate transformation 102 in accordance with the following equation:

$$\begin{pmatrix} x \\ y \end{pmatrix} = M \begin{pmatrix} a & 0 & c \\ 0 & b & d \end{pmatrix} \begin{pmatrix} X \\ Y \\ 1 \end{pmatrix} \quad (4)$$

where a and b represent predetermined constants for use in transforming the coordinate system of the detection coil printed board 13 of the electromagnetic coupling type digitizer into the coordinate system of the liquid crystal panel 12; and c and d represent variables for the start address varying with a scroll appointment at a time, the variables changing the values every time scroll and zooming commands are entered. M represents a variable indicative of the magnification of zooming, the variable changing its value upon the zooming command and its release. The solved coordinate (x, y) is delivered to an application 44 and to an echo-back control 43. In the echo-back control 43, a mode assigned at the time is added to the obtained coordinate (x, y) and an output to a frame memory development 45 is requested. For example, in the case where a certain dot is displayed, at the frame memory development 45, the frame memory 22 is requested to write-in 1 at the portion of the frame memory 22 corresponding to the coordinate (x, y).

Figure 14:
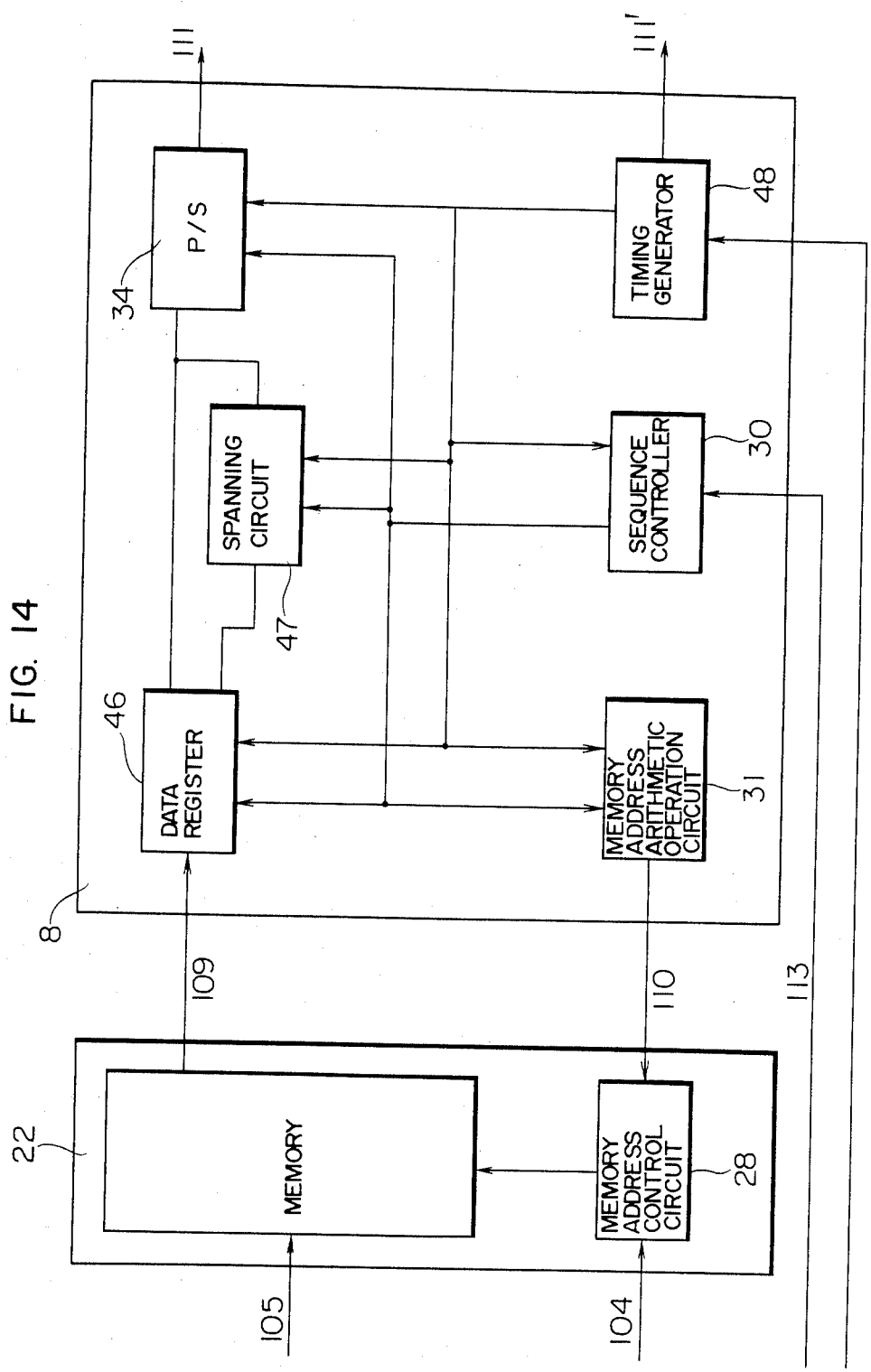
FIG. 14 is a block diagram of the frame memory and LCD controller in the second embodiment.

FIG. 14 is a block diagram showing data flow at the frame memory 22 and transformation controller 8. In the frame memory 22, the memory address control circuit 28 calculates upon request of the CPU 4 the memory address corresponding to the output coordinate for the liquid crystal panel 12, and writes in at the addressed portion the output coordinate data for the liquid crystal panel 12. Furthermore, the output coordinate data transferred from the transformation controller 8 via a memory address signal line 110 is transferred to the transformation controller 8 through a frame memory read-out signal line 109.

In the transformation controller 8, a sequence control circuit 30 stores zooming display command and start address transferred from the CPU via the zooming and start address signal line 113, and based on the stored information, controls associated circuits in the transformation controller 8. The transformation controller 8 reads out the output coordinate data from the frame memory 22 and converts it into a liquid crystal display signal which is transferred to the liquid crystal column drivers 21. In the present embodiment, the liquid crystal panel 12 uses 640×256 dots, and a register storing a start address is included in the sequence control circuit 30.

First, based on the start address stored in the sequence control circuit 30, memory addresses for the frame memory 22 corresponding to the respective output coordinates of eight screens of the liquid crystal panel 12 divided at a memory address arithmetic calculation circuit 31 are sequentially calculated, and the output data corresponding to the addresses in the frame memory 22 is requested. The output coordinate data are transferred via the data register 46 to respective ones of the eight registers of a parallel/serial (P/S) conversion circuit 34 corresponding to respective partial screens. The data is converted into a serial display signal which is transferred to the liquid crystal column driver 21.

In the case of zooming display, based on the zooming command and start address stored in the sequence control circuit 30, memory addresses for the frame memory 22 corresponding to the respective output coordinates of eight screens of the liquid crystal panel 12 divided at the memory address arithmetic calculation circuit 31 are sequentially calculated, and the output data corresponding to the addresses in the frame memory 22 are requested. Since in the present embodiment only the $\frac{1}{2}$ zooming display is available, the amount of output coordinate data four times as large as that in the equal magnification is required. The output coordinate data is transferred via a data register 46 to a zooming circuit 47, wherein data is converted into one-point data obtained through a logical product of four point data disposed transversely and laterally adjacent to each other. The one-point data is transferred to the parallel/serial conversion circuit 34 similarly to the above.

Clock signals for the timings and for the liquid crystal drivers 20 and liquid crystal column drivers 21 are generated at a timing generator circuit 48 based on a main clock signal transferred from the CPU 4 via a main clock signal line 114.

With the above embodiment, (i) in the inputting of an input coordinate the zooming command and start address information signals are respectively stored as the variables of the equation (4) through the CPU 4. It is possible to readily effect coordinate transformation for zooming display and scroll appointment by using the equation (4). Furthermore, even if the line densities between that of the detection coil printed board 13 of the electromagnetic coupling type digitizer and that of the liquid crystal panel 2 do not coincide with each other, the coincidence of input and output points can be attained. (ii) At the output section, the liquid crystal controller 7 stores the start address and zooming display command and based on the stored information, the address, calculates for the display. The position under processing can be properly indicated since the zooming command and start address at the input and output sections are simultaneously rewritten. (iii) If the scroll appointment section 25 is mounted on the crystal display panel 12 so as to provide an exclusive area for the former, the mode changeover is not necessary for the scroll appointment and coordinate input. (iv) By employing an electromagnetic coupling type digitizer for requesting a scroll operation, the scroll operation can be initiated through a stroke drawn on the digitizer. Also, the scroll operation in any desired direction and at any desired speed can be achieved.

(5) Third Embodiment of the Invention

The description for the third embodiment of the present invention is directed to the case where the input integrated flat panel display is used as a peripheral device of a personal computer, for example. Elements designated by identical numerals as used in description of the first and second embodiments perform the same corresponding functions.

Although a frame memory for the liquid crystal display is additionally provided in the present embodiment, this has been adopted in view of the differences in the refresh systems of the CRT display and liquid crystal display.

The overall brief description of the present embodiment will be given in the following.

The present embodiment can provide an input integrated flat panel display which is easy to be connected and versatile in use by using conventional signal lines provided at the personal computer main frame.

In order to connect the input integrated flat panel display to a computer (processing machine) main frame, such as a personal computer, a video signal line for CRT screen display is utilized, which line is connected to the computer as an interface. In this case, since the display resolution of the CRT is different from that of the display section of the input integrated flat panel display, the whole screen of the CRT can not be displayed within the input integrated flat panel display. Therefore, by storing information on which part of the video signals on the CRT screen to be displayed and based on the stored information, the input coordinate from the digitizer as the input means of the input integrated flat panel display is transformed into the coordinate information for the display screen so as to be transferred to the computer main frame. Further, based on the stored information as to which part of the video signals on the CRT screen are to be displayed, the display is carried out by partially picking up the display screen information to be displayed on the display from the video signals from the personal computer main frame, thus attaining coincidence between the input and display screen coordinates.

The embodiment will now be described with reference to the accompanying drawings.

Figure 15:
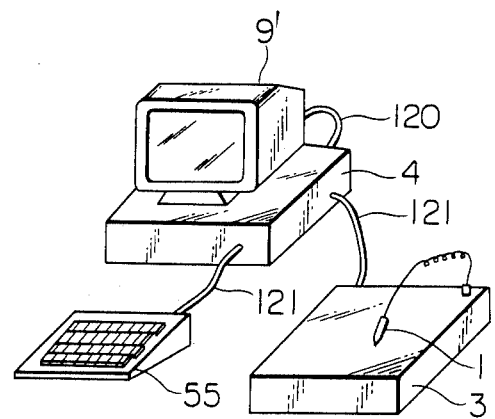
FIG. 15 shows an outer appearance of a general system arrangement employed in writing hand-written characters and graphics using a personal computer, in association with a third embodiment of the present invention.

FIG. 15 shows an outer appearance illustrating a general system arrangement for inputting handwriting characters and graphics by using a personal computer. A CRT display 9' with a display resolution of 640×400 dots and the digitizer 3 with the coordinate input pen 1 are connected to the personal computer main frame 4 respectively through a video signal line 120 and an expansion interface signal line 121 (for example, RS 232 C signal line). Numeral 55 represents a keyboard, and numeral 121 represents a keyboard signal line.

Figure 16:
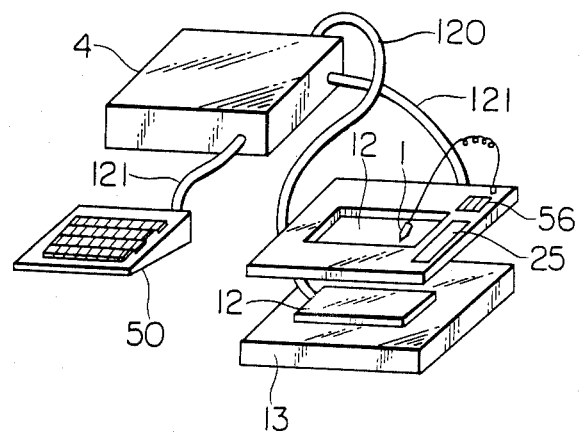
FIG. 16 shows an outer appearance of the whole arrangement of the third embodiment.

In contrast, FIG. 16 shows the outer appearance of the present embodiment, in which the connection of the input integrated flat panel display 5 to the personal computer main frame 4 is arranged by using the expansion interface signal line 121 as an input from the digitizer and using the video signal line 120 itself as an output. In the present embodiment, the input integrated flat panel display is constructed as a unitary one by laying the 640×200-dot liquid crysal panel 12 upon the detection coil printed board 13 of the electromagnetic coupling type digitizer. On the surface of the input integrated flat panel display, there are mounted a handwriting section 12, scroll appointment section 25, and color appointment section 56, all outputs of which are detected on the detection coil printed board 13 of the digitizer. The handwriting section 12 also operates as the liquid crystal display screen, while the scroll appointment section 25 is provided so as to properly perform a scroll function in view of the fact that the display area of the display section (liquid crystal panel 12) of the input integrated flat panel display is smaller than the CRT display 9'. The color appointment section 56 including three areas R, G, and B corresponding to respective chrominance components, is provided for avoiding the loss of color information.

Figure 17:
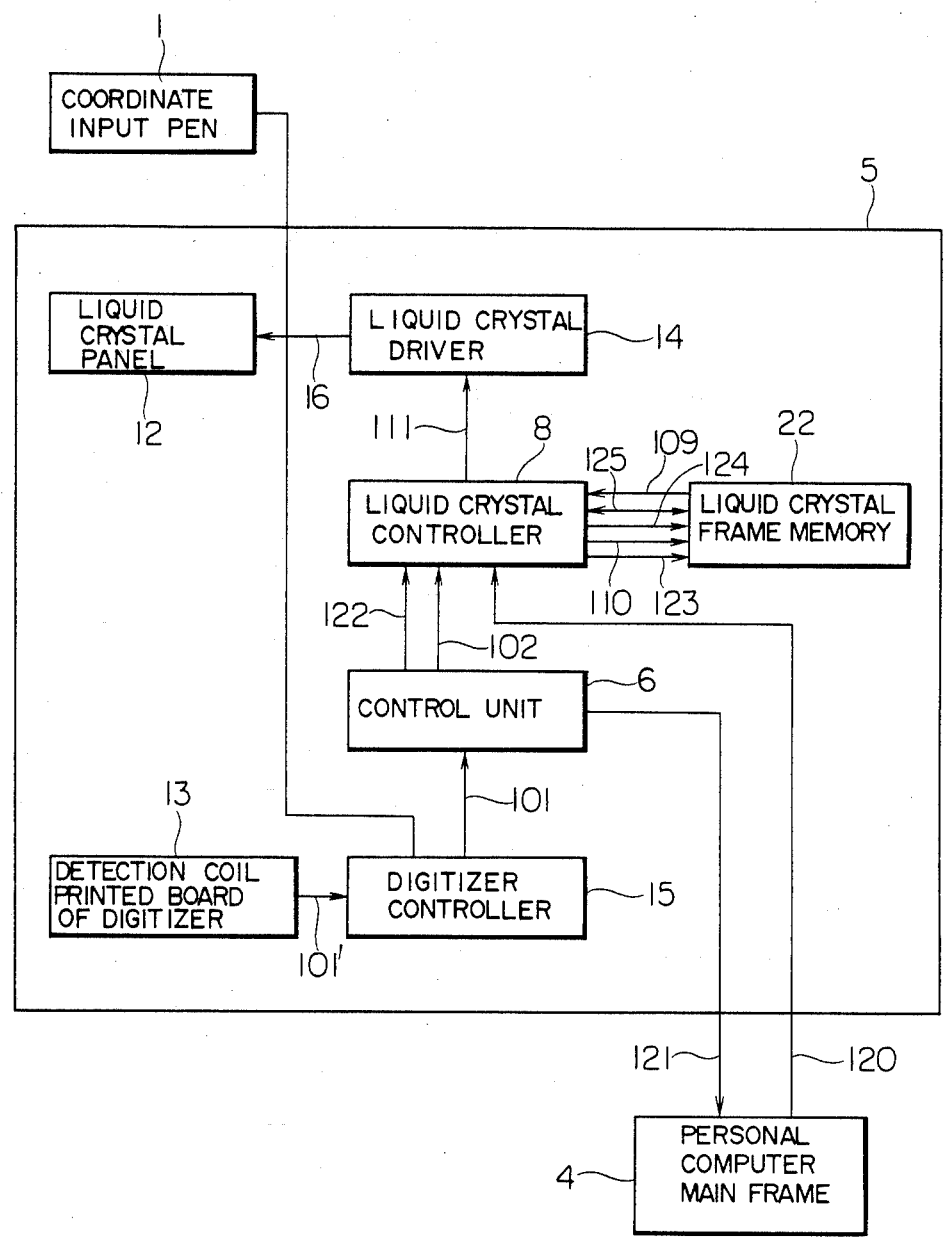
FIG. 17 shows an overall arrangement of the third embodiment.

The operation of the input integrated flat panel 5 will be described with reference to FIG. 17.

The input coordinate pointed out with the coordinate input pen 1 through the detection coil printed board 13 of the digitizer is transferred to the digitizer controller 15 via a digitizer detection coordinate signal line 101' and hence to the control unit 6 via an input coordinate signal line 101. The input coordinate information delivered to the control unit 6 is transformed into coordinate information of the display screen (CRT). In this case, only the start address (scroll appointment) and color information are transferred via the start address signal line 102 and a color selection signal line 122 to the liquid crystal controller 8 serving as the display control section which controls the display on the liquid crystal display. The input coordinate information transformed into other coordinate information for the display screen is transferred via the expansion interface signal line 121 to a video memory (not shown) of the personal computer main frame 4. In the present embodiment, the video memory for storing the information for the large screen is included in the personal computer main frame. The reason to transfer the start address (scroll appointment) to the transformation controller 8 is to move the portion fetched from the video signals by acting upon the scroll appointment section 25. The reason to transfer the color information to the transformation controller 8 is that the loss of the color information can be avoided while the CRT video signal with color information is used for the monochrome input integrated flat panel display.

The transformation controller 8 reads out the display screen information stored in the video memory of the personal computer main frame 4 through a video signal line 120. The transformation controller 8 picks up necessary portions from the stored information and requests a write-in to the liquid crystal frame memory 22 via a liquid crystal frame memory write-in command line 123, and writes the display screen information into the liquid crystal frame memory using a liquid crystal frame memory write-in address signal line 110 and a liquid crystal frame memory write-in data signal line 124. In other words, the transformation controller 8 temporarily stores the start address and color information transferred from the control unit 6 and selects necessary display screen information in accordance with the temporarily stored information so as to write it in the liquid crystal frame memory 22. Furthermore, the transformation controller 8 delivers a read-out address onto a liquid crystal frame memory read-out address signal line 125 in order to read out the display screen information written in the liquid crystal frame memory 22, and reads out as output data the information in a parallel form from the liquid crystal frame memory 22 via a liquid crystal frame memory read-out data signal line 109. Thereafter, the read-out data is converted into a parallel to serial form at the transformation controller 8 to thereby deliver it to the liquid crystal driver 14 via a serial output data signal line 111. The liquid crystal driver 14 causes the liquid crystal panel 12 to display the coordinate of the display screen via the liquid crystal display signal line 16 (flexible printed wiring board).

Figure 18:
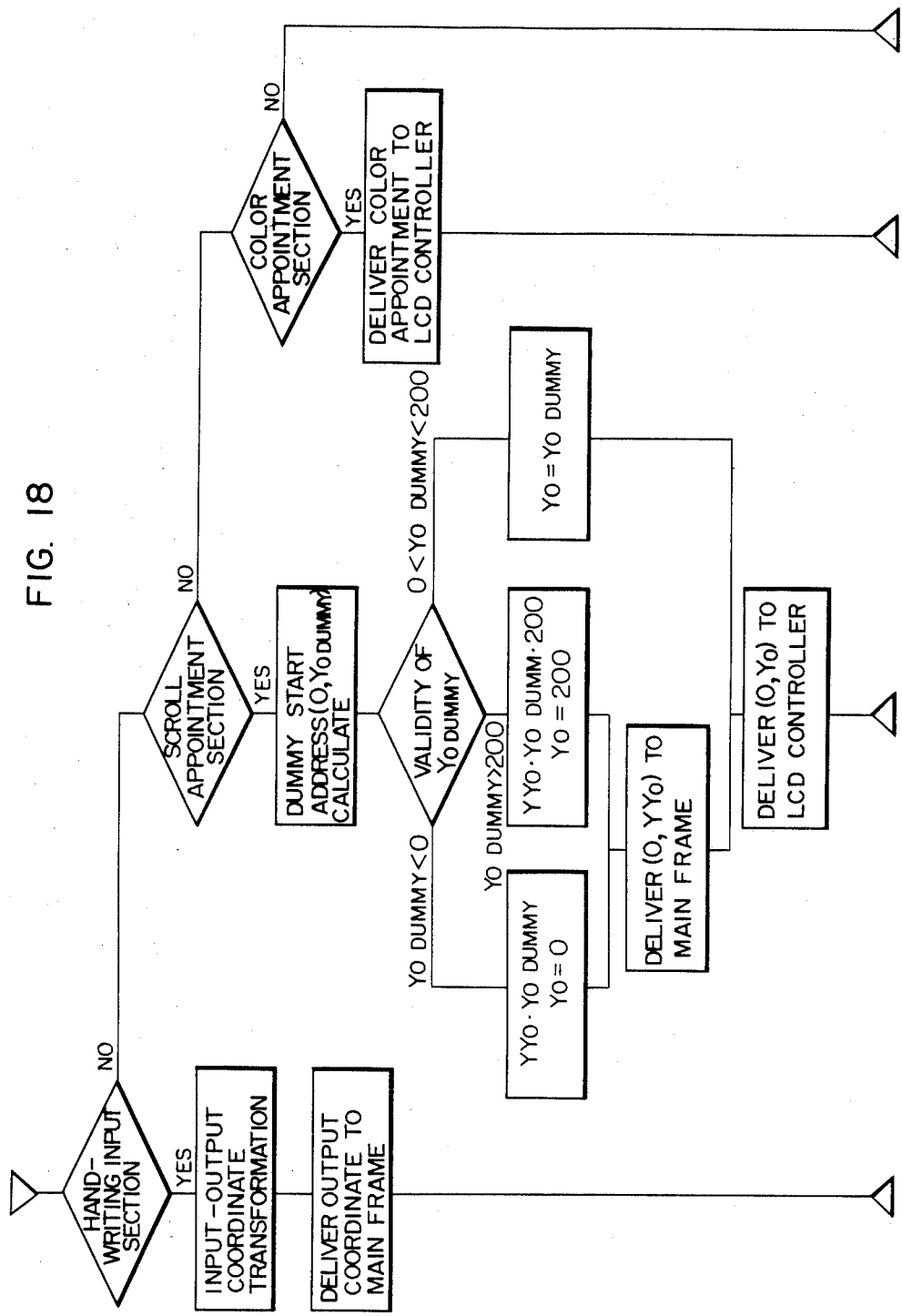
FIG. 18 is a flow chart for explaining the operation of the control unit in the third embodiment.

Next, the operation of the control unit 6 will be described with reference to FIG. 18.

First, the input position of the coordinate input pen 1 is checked from the detection coil printed board of the digitizer as to which section among the handwriting input section 12, scroll appointment section 25, and color appointment section 56 includes the input position. Thereafter, particular processings for each section are performed.

First of all, if the input coordinate transferred from the digitizer controller 15 is within the handwriting section 12, then the pointed position (X, Y) is transformed into the corresponding display screen coordinate (x, y) of the CRT as a large screen. The display screen coordinate (x, y) is transferred to write it in the video memory of the personal computer main frame 4. The equation for transforming the input coordinate (X, Y) into the display screen coordinate (x, y) is as follows, $$\begin{pmatrix} x \\ y \end{pmatrix} = \begin{pmatrix} a & 0 & b \\ 0 & c & d \end{pmatrix} \begin{pmatrix} X \\ Y \\ 1 \end{pmatrix} + \begin{pmatrix} 0 \\ Y_0 \end{pmatrix} \quad (5)$$

where a, b, c, and d represent predetermined constants for use in transforming the digitizer coordinate system into the liquid crystal coordinate system (0, $Y_0$) represents an address, which is called a start address, for the video memory of the personal computer main frame corresponding to the upper left coordinate in the liquid crystal display screen. The start address (0, $T_0$) as described later is a variable given in accordance with the scroll appointment, and it becomes (0, 0) if the scroll appointment is given. The input coordinate (X, Y) of the detection printed board 13 of the digitizer is thus transformed into a display screen coordinate (x, y) of the CRT beforehand, and the transformed coordinate is transferred to the video memory of the personal computer main frame 4.

Secondly, if the input coordinate transferred from the digitizer controller 15 is within the scroll appointment section 25, then the start address (0, $Y_0$) is calculated. The way to appoint a scroll and to calculate the start address are described in detail with reference to FIGS. 19(a) and 19(b).

The scroll appointment is carried out by drawing a stroke with the coordinate input pen 1 on the scroll appointment section 13 to designate the distance and speed of the scroll. FIGS. 19(a) and 19(b) are views illustrating points on strokes drawn on the scroll appointment section 25 with the coordinate input pen 1.

Signals from the drawn stroke are detected by the detection coil printed board 13 of the digitizer at a certain constant timing. The first detected point is regarded as a starting point ($X_s$, $Y_s$) and the second point is regarded as an end point ($X_e$, $Y_e$) detected after a certain timing. The length of the line defined by the starting and end points corresponds to the movement of the displayed screen. The scroll operation can also be effected in the horizontal direction (X-direction), the description being limited to the vertical direction (Y-direction).

The start address calculation will be described in connection with the following equation and FIG. 19;

$$Y_{0\ DUMMY} = Y_0 + (Y_s - Y_e) \quad (6)$$

where $Y_{0\ DUMMY}$ represents a dummy start address, and $Y_0$ represents a start address at the preceding time. Upon calculation of the start address $Y_{0\ DUMMY}$, the validity of $Y_{0\ DUMMY}$ is checked. If the dummy start address is within the assigned area in the video memory of the personal computer main frame 4; i.e., $$0 < Y_{0\ DUMMY} < 200$$

then $Y_0 = Y_{0\ DUMMY}$, and the start address (0, $Y_0$) is transferred to the transformation controller 8 to instruct which part of the video signals is to be written into the frame memory 22. If a stroke is drawn with the pen from the starting point to the end point, consecutive pairs of starting and end points are generated, thereby the screen moves in correspondence with its locus. In this case, the timings at which the detection coil printed board 13 of the digitizer detects signals are constant. Therefore, if the stroke is rapidly drawn on the scroll appointment section 25, then the number of points detected per one stroke becomes smaller (FIG. 19(a)) and hence ($Y_s - Y_e$) becomes larger resulting in a large movement of the display screen. Alternatively, if the stroke is slowly drawn, then the number of points per one stroke becomes larger (FIG. 19(b)) and hence $|Y_s - Y_e|$ becomes smaller resulting in a small movement of the screen.

If a newly calculated dummy start address is beyond the dimension of the video memory of the personal computer main frame, i.e., if $$Y_{0\ DUMMY} < 0$$

$$Y_{0\ DUMMY} > 200$$

then, $$YY_0 = Y_{0\ DUMMY}\ Y_0 = 0$$

$$YY_0 = Y_{0\ DUMMY} - 200\ Y_0 = 200$$

are set and hence (0, $Y_0$) is transferred to the controller 8 while (0, $YY_0$) is transferred to the personal computer main frame 4 via the expansion interface signal line 121 to request the rewrite of the video memory.

Further, if the input coordinate transferred from the digitizer controller 15 is within the color appointment section 56, then the appointed color information is transferred to the controller 8 to request the screen display of its color.

Figure 20:
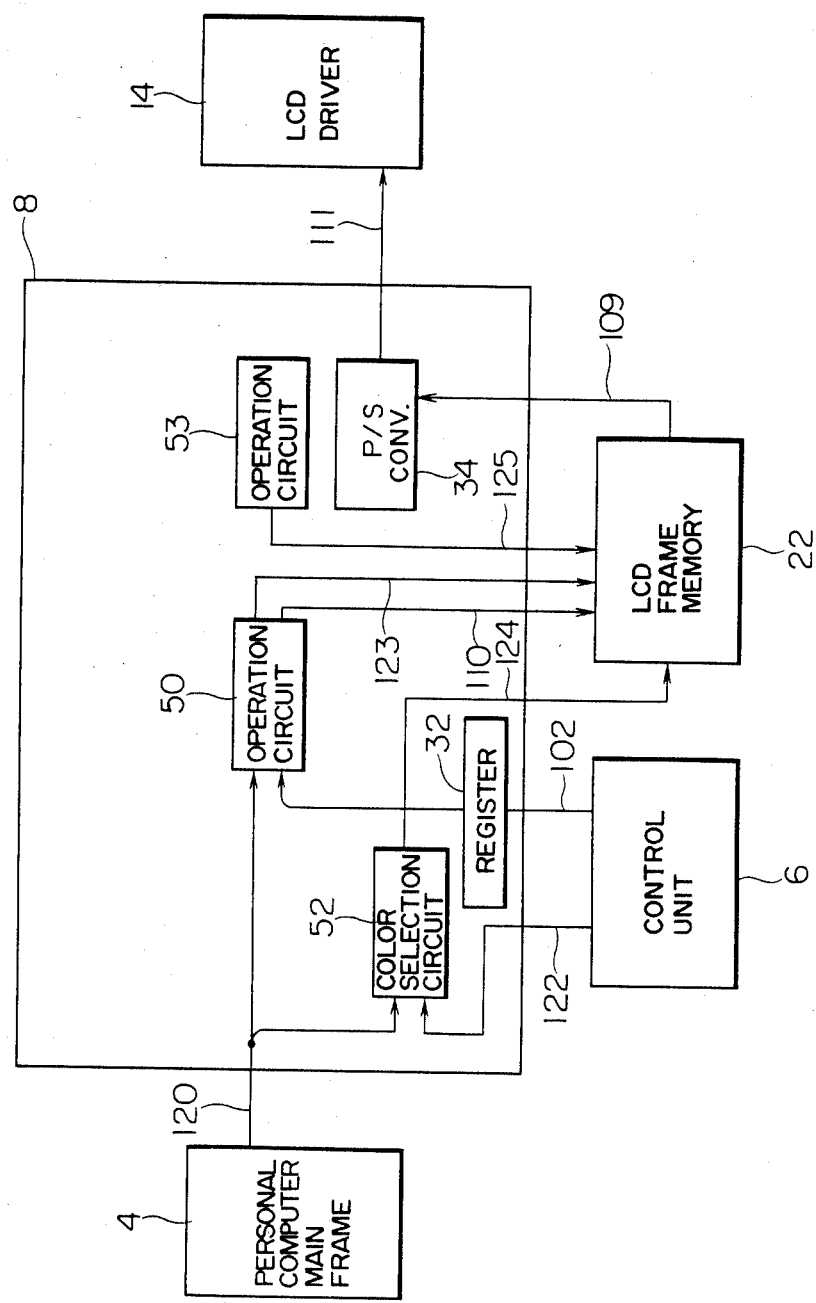
FIG. 20 is a block diagram of the LCD controller in the third embodiment.

FIG. 20 is a block diagram of the controller 8. Video signals R, G, B, $H_{sync}$, and $V_{sync}$ from the personal computer main frame 4 via the video signal line 120 are transferred to a judgement and liquid crystal frame memory input address arithmetic operation circuit 50 where the address of the video data is counted. The start address transferred from the control unit 6 via the start address signal line 102 is temporarily stored in a start address storing register 32, the start address being compared with the address for the video data at the judgement and liquid crystal frame memory input address arithmetic operation circuit 50. Among the video data, that data corresponding to 200 lines starting from the line coinciding with the start address is requested to be written into the liquid crystal frame memory 22 via the liquid crystal frame memory write-in command signal line 123. The detailed operation of the judgement and liquid crystal frame memory input address arithmetic operation circuit 50 will be given later with reference to FIG. 21. The video data R, G, and B associated with color information are transferred to the color selection circuit 52, while the color information appointed at the color appointment section 56 is transferred to the same color selection circuit 52 via the color selection signal line 122. In the color selection circuit 52, the serial data transformed into parallel data of one word eight bits is transferred to the liquid crystal frame memory 22 via the liquid crystal frame memory write-in data signal line 124. The detailed operation of this circuit will be given with reference to FIG. 22. The liquid crystal frame memory read-out address arithmetic operation circuit 53 calculates the address of the liquid crystal frame memory 22 for the data to be displayed on the liquid crystal panel 12 and requests a read-out via a liquid crystal frame memory read-out address signal line 125. The read-out data is transferred via the liquid crystal memory read-out data signal line 109 to the P/S conversion circuit 34 to convert it into a serial liquid crystal signal which is transferred to the liquid crystal driver 14 via the serial output data signal line 111.

Figure 21:
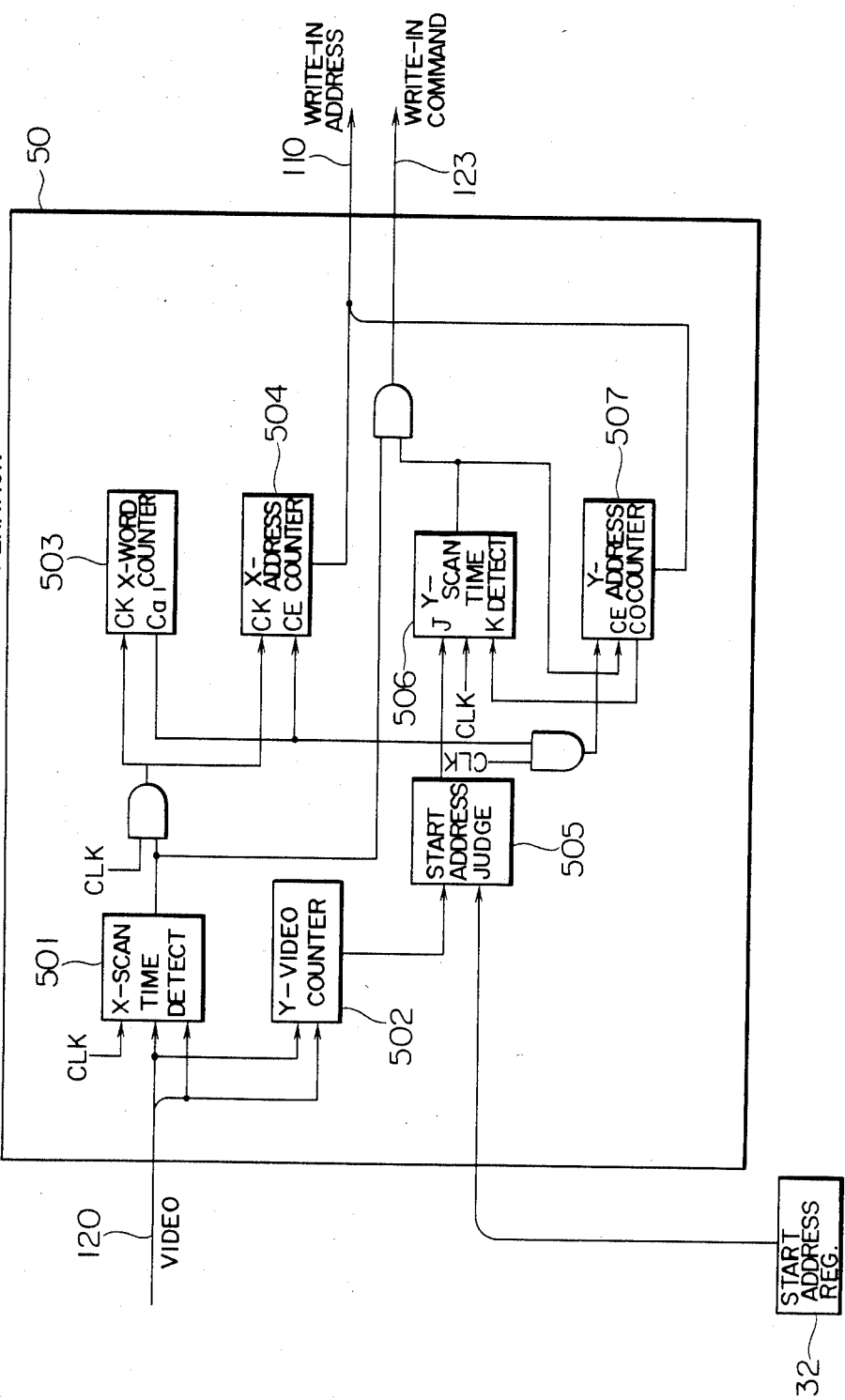
FIG. 21 is a block diagram of the circuit for the judgement in the LCD controller and for the arithmetic and logic operation of the write-in address of the LCD frame memory according to the third embodiment.

FIG. 21 is a block diagram of the judgement and liquid crystal frame memory write-in address arithmetic operation circuit 50. Among the video signals transferred from the personal computer main frame 4, the synchronous signals $H_{sync}$ and $V_{sync}$ are inputted to an X-direction scanning the detection circuit 501. Since each dot of the video data signal is latched, the detection circuit 501 makes its output a logical "High" during the actual X-direction scanning time $H_{sync}$, based upon a video latch signal (CLK) delivered from the personal computer main frame 4. $H_{sync}$ and $V_{sync}$ are also inputted to a video signal Y-direction counter 502. The counter 502 counts up upon $H_{sync}$ and clears upon $V_{sync}$ for counting the address of the video memory for the video data. While the output from the X-direction scanning time detection circuit 501 is a logical "High", an X-direction word counter 503 counts (3 bit counter) one word data (8 bits) and inputs an output carry to an X-direction address counter 504 which in turn counts the address of the X-direction. A start address judgement circuit 505 compares the video data address output from the video signal Y-direction counter 502 with the start address output from the start address storing register 32. If both are equal, the judgement circuit 505 makes the output "High". A Y-direction scanning time detection circuit 506 receiving the "High" output is a J/K flip-flop which makes its output "High" while the liquid crystal panel 12 is scanned for the number of lines (200 lines) in the Y-direction. The signal input to the K terminal of the circuit 506 is a carry output generated by a Y-direction address counter 507 which counts the line number of the Y-direction. At the same time, the Y- direction address counter 507 counts the Y-direction address for the liquid crystal frame memory 22. In particular, while the logical product of the output from the X-direction scanning time detection circuit 501 and the output from the Y-direction scanning time detection circuit 506 is "High", the liquid crystal frame memory 23 is requested for writing the data via the liquid crystal frame memory write-in command signal line 123. The addresses counted by the Y-direction address counter 507 and X-direction address counter 504 are tranferred via the liquid crystal frame memory write-in address signal line 110.

Figure 22:
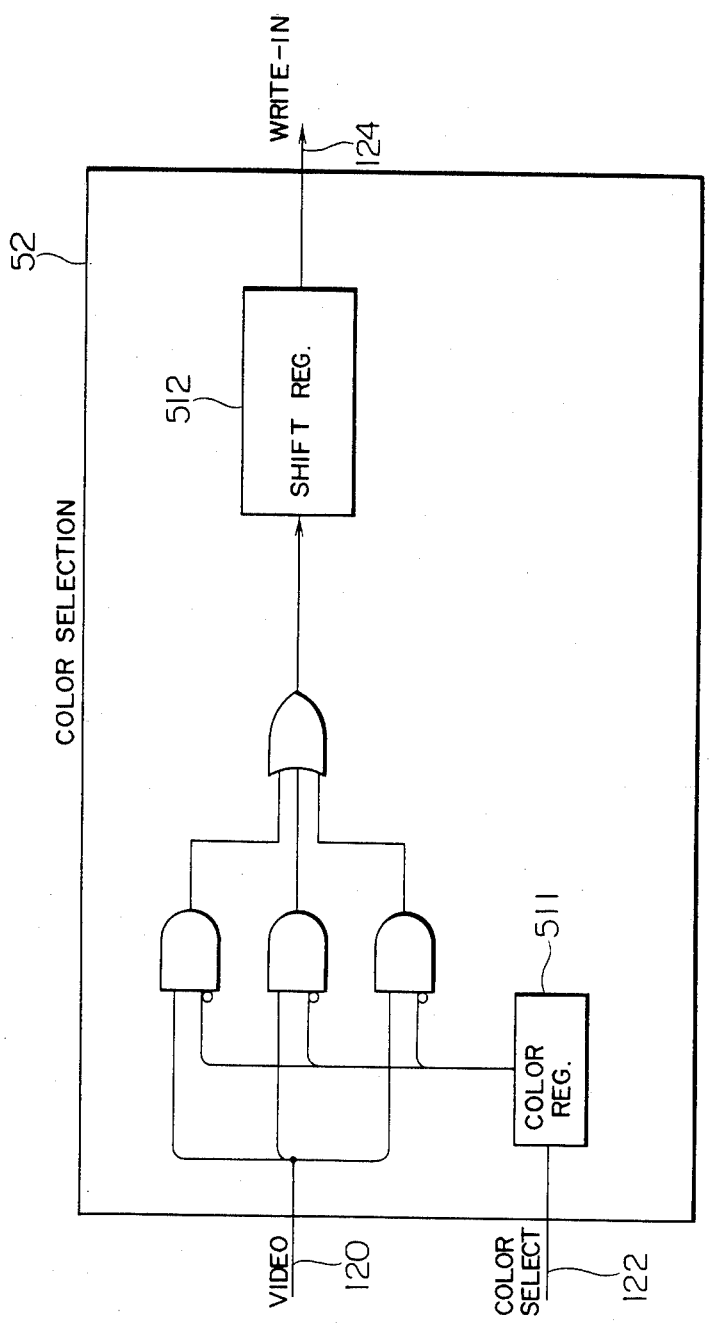
FIG. 22 is a block diagram of a color selection circuit in the LCD controller of the third embodiment.

FIG. 22 is a block diagram of the color selection circuit 52. The video data R, G, and B among the video signals delivered from the personal computer main frame 4 are transferred to the color selection circuit 52. The color information r, g, and b from the control unit 6 are transferred via the color selection signal line 122 to a color information register 511 where the information is temporarily stored. Then, $\bar{r}\cdot R + \bar{g}\cdot G + \bar{b}\cdot B$ is inputted to the serial input terminal of a shift register 512. For example, if the red portion of the color appointment section 56 is appointed, then $$r=0, g=1, b=1$$

are transferred from the control unit 6 and becomes $$\bar{r}\cdot R + \bar{g}\cdot G + \bar{b}\cdot B = R$$

Therefore, only R of the video data is inputted to the serial input terminal of the shift register 512. The shift register 512 provides a one word (8 bits) parallel output which is transferred via a liquid crystal frame memory write-in data signal line 124 to the liquid crystal frame memory 22.

According to the present embodiment as described above, information (start address) on which part of the large display information is to be displayed is previously stored. Based upon the stored information, the input coordinate is transformed into the coordinate information of the display screen to thereby transfer it to the personal computer main frame. Only necessary information is picked up from the large display screen information (video signal) using the start address. Therefore, even if the CRT video signal line is used as an interface, the coincidence between the input coordinate and the display screen coordinate can be attained.

Furthermore, since the scroll appointment section 25 is provided in order to enable the alteration of a start address, the movement of the display screen can be readily performed with the coordinate input pen 1. In addition, the rewriting of the video memory of the personal computer main frame can be appointed in the similar manner.

Still further, since the color appointment section 56 is provided, the loss of color information appointed with the coordinate input pen 1 can be avoided.

In the present embodiment, the CRT display resolution has been set as 640×400 dots. However, also in the case of 1280×1024 dots, by using ($X_\phi$, $Y_\phi$) as a start address, a partial image of the CRT screen displayed on the input section 12 of the flat panel display can be scrolled up and down and right and left. Thus, the invention is applicable regardless of the display resolution of the CRT screen.

In the present embodiment, it is apparent that the man-machine performance is improved if both input integrated flat panel display system and CRT display are used. In this case, the video signal line from the personal computer main frame is connected not only to the liquid crystal display section of the input integrated flat panel display but also to the CRT display so that both input integrated flat panel display and CRT display can be displayed.

(6) Other Modifications of the Invention

In the first, second, and third embodiments, the description has been directed to system arrangements such as the case where both inputs integrated flat panel display and CRT display are used or the case where the input integrated flat panel display is used independently.

Modifications made upon the detail of the input integrated flat panel display system according to the present invention will be given in the following.

(1) A CRT coordinate input area is mounted on the input surface of the input integrated flat panel display.

Figure 23:
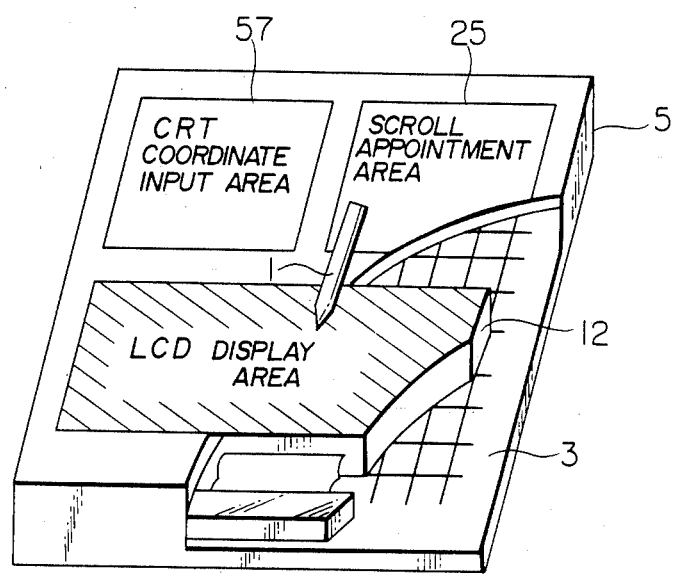
FIG. 23 is an outer appearance of the input integrated flat panel display unit according to a modification of the present invention.

FIG. 23 shows the outer appearance of the input integrated flat panel display. The input integrated flat panel display 5 is provided on its surface with the CRT coordinate input area 57 as well as the liquid crystal display section 12 (liquid crystal panel) serving as a hand-writing input section, scroll appointment section 25, zooming display section 26 (not shown) and so on. Numeral 1 represents the coordinate input pen, and numeral 3 represents the electromagnetic coupling type digitizer.

The provision of such a CRT coordinate input area 57 is to aim at improving the man-machine performance while the input integrated flat panel display is used in common with the CRT display. In particular, the CRT coordinate input area is used for performing a rough stroke input and point input. In performing rough input work, a long stroke input or point input such as an icon system can be carried out on the CRT coordinate input area while observing the CRT screen, similar to the conventional digitizer input system (system composed of a digitizer and CRT display).

As described with reference to the aforementioned embodiments, the liquid crystal display area 12 combines the input and output, and a fine point input or stroke input can be performed on the liquid crystal display area 12. The scroll appointment area 25 is an area for instructing to display any desired partial image of the CRT screen, the scroll appointment area 25 making the partial image of the CRT supplied with a series of fine inputs which are output onto the liquid crystal display area 12 by acting upon the scroll appointment area 25.

Although three areas have been set due to both uses of the input integrated flat panel display and CRT display, three keys may be provided instead. This is a method to distinguish between three cases by appointing one of the keys.

(2) Improvements on Cursor Display.

In the input integrated flat panel display having the liquid crystal area, scroll appointment area, and CRT coordinate input area described in the above section (1), the liquid crystal display area is used as an input area for inputting a fine point input. Therefore, it can be thought of as a cursor display. However, the cursor will flicker so that the user on the contrary thinks it annoying. Therefore, if the cursor display is given on a distinguished area only when a rough stroke or point input is carried out on the CRT coordinate input area, a more serviceable system for the user can be realized.

(3) Other Structure Of the Input Integrated Flat Panel Display.

The input integrated flat panel display of the present invention has been described as having an arrangement including the upper liquid crystal panel and lower electromagnetic coupling type digitizer. However, it is possible to use as a display device a flat panel display such as EL, or plasma display device and to mount upon such display device a transparent digitizer such as of a pressure-sensitive type or elastic wave type.

(7) Advantageous Effects of the Invention

According to the present invention, disadvantages caused by the small dimension of the display screen are eliminated as compared with the conventional input integrated flat panel display.

Furthermore, by using as an input device an input integrated flat panel dispay and using as an output device a highly precise and fine CRT display, the man-machine performance improves extraordinarily. Therefore, in the case where the amateur end user performs a document processing, graphic processing or the like at the office, the input integrated flat panel system according to the present invention can be considered as one of ADSs (Advanced Office work-Station).

We claim:

1. An input integrated flat panel display system comprising:
   an input integrated flat panel display device having an integrated structure, including input means for inputting handwritten data in the form of characters, graphics, and points and a flat display panel integrally combined with said input means for displaying display point data corresponding to handwritten data input through said input means;
   processing means for recognizing whether the display point data relates to characters or graphics and for providing the display point data to the flat display panel for display;
   large screen frame memory means coupled between said display device and said processing means for storing display point data for display on a large screen having a larger display area than that of said flat display panel;
   register means responsive to said input means for storing a start address indicative of a portion of said display point data for the large screen which is to be displayed on said flat panel display;
   transformation control means connected to said register means for transforming said input handwritten data into display point data for display on a large screen and for transferring said display point data to said processing device based upon the start address from said register means; and
   display control means responsive to said start address from said register means, for extracting a portion of said display point data from said large screen frame memory means for display on said flat display panel and for transforming said portion of data into display point data for said flat display panel.

2. An input integrated flat panel display system according to claim 1, wherein said input means comprises an electromagnetic coupling type digitizer and a liquid crystal display device forming said flat display panel is disposed upon said digitizer.

3. An input integrated flat panel display system according to claim 1, wherein said input means includes a scroll appointment section including means for inputting said start address by means of a hand-held coordinate input pen, said scroll appointment section being integrated with said flat display panel, and further including means for changing the transfer of said input handwritten data to said transformation control means and the extracting of the display point data for said large screen at said display control means by changing the start address in said register means.

4. An input integrated flat panel display system according to claim 3, wherein the start address for the point data for said large screen is changed by said changing means in accordance with the direction, distance, and speed of a stroke by said coordinate input pen for changing the start address on said scroll appointment section.

5. An input integrated flat panel display system according to claim 1, wherein said input means includes a zooming display section including means for appointing a zooming display, said zooming display section being integrated with said flat display panel, said transformation control means including means responsive to said zooming display section for changing the magnification of transformation of said input handwritten data into said display point data for said large screen, and said display control means includes means for extracting a portion of said display point data for said large screen, said extracted portion being proportional to a reciprocal of said magnification of transformation, and for displaying said extracted portion on said flat display panel.

6. An input integrated flat panel display system comprising:
   an input integrated flat panel display having an integrated structure, including input means for inputting handwritten data in the form of characters, graphics, and points, and a flat display panel laid upon said input means for displaying information corresponding to input point data input through said input means;
   processing means for distinguishing whether said input point data relates to characters or graphics and for providing display point data to the flat display panel;
   large screen frame memory means coupled between said flat panel display and said processing means for storing display point data for a large screen having a larger display area than that of said flat display panel;
   flat panel display frame memory means for storing display point data for display on said flat panel display;
   register means responsive to said input means for storing a start address indicative of a portion of said display point data for the large screen which is to be displayed on said flat display panel;
   transformation control means for transforming said input handwritten data into display point data for said large screen and for transferring said display point data to said processing device based upon the start address stored in said register means; and
   display control means responsive to the start address from said register means, for extracting a portion of said display point data for said large screen from said large screen frame memory means and for transforming said extracted portion into display point data for display on said flat display panel.

7. An input integrated flat panel display system according to claim 6, wherein scroll appointment means for changing said start address is integrated with said flat display panel, and includes means for changing the transfer of said input handwritten data to said control means and the extracting of the display point data for said large screen at said display control means by changing the start address for the point data for said large screen.

8. An input integrated flat panel display system according to claim 6, further comprising color appointment means integrated with said flat panel display for appointing color information, said transformation control means and said display control means being controlled by said color information so that the appointed color is displayed on said flat display panel.

9. An input integrated flat panel display system comprising:
   (a) an input integrated flat panel display structure including input means for inputting handwritten data in the form of characters, figures and points and a flat panel display integrated with said input means for displaying an image corresponding to said input handwritten data from said input means;
   (b) processor means coupled to said input means for discriminating whether said input handwritten data is a character or a figure and for providing display point data for display by said flat panel display;
   (c) control means coupled between said input means and said processor means for transforming input data from said input means into display point data for a large display screen, based on the start address held in said start address providing means, and for transferring said transformed display point data to said processor means;
   (d) frame memory means coupled to said processor means for storing display point data received from said processor means, said frame memory means having a capacity for storing display point data for a large display screen having a larger display area than that of the flat panel display;
   (e) start address providing means responsive to said input means for holding a start address designating which portion of said display point data stored in said frame memory means is to be displayed on said flat panel display; and
   (f) display control means, connected between said frame memory means and said flat panel display and responsive to the start address from said start address providing means, for extracting from said frame memory means a portion of said display point data for said large screen and for transforming the extracted portion into display point data for said flat panel display screen to display the transformed data thereon.

10. The system according to claim 9, further comprising means including a cathode ray tube connected to receive display point data from said frame memory means for displaying said data thereon in parallel to the display of transformed data by said flat panel display.

11. The system according to claim 9, further comprising second frame memory means connected to said processor means for receiving display point data from said processor means and for storing said display point data in parallel with the storing of said display point data in said first-mentioned frame memory means, and means including a cathode ray tube connected to said second frame memory means for displaying said display point data.

12. For use in a display system having a processor providing display point data, a frame memory for storing display point data, and a display device having a large image screen for displaying display point data, a display data processing system comprising:
   (a) an input integrated flat panel display structure including input means for inputting handwritten data in the form of characters, figures and points, and flat panel display which is smaller than said large image screen and is integrated with said input means for displaying an image corresponding to said handwritten input data as a partial image of an image displayed on the large image screen;
   (b) register means responsive to a position designation signal from said input means for holding a start address designating which portion of display point data for the large image screen is to be displayed on said flat panel display;
   (c) first display point data transformation means responsive to said input means for transforming handwritten input data into display point data for the large image screen, based on the start address held in said register means; and
   (d) second display point data transformation means responsive to the start address held in said register means for extracting a portion of said display point data for the large image screen and for transforming the extracted portion into display point data for the flat panel display, to thereby provide data for display of a partial image formed by the transformed data on the flat panel display, simultaneously with display of an entire image formed by the display point data from said first display point data transformation means on the display device having the large screen.

* * * * *